United States Patent
Nahmias et al.

(10) Patent No.: US 11,500,410 B1
(45) Date of Patent: Nov. 15, 2022

(54) SYSTEM AND METHOD FOR PARALLEL PHOTONIC COMPUTATION

(71) Applicant: Luminous Computing, Inc., Menlo Park, CA (US)

(72) Inventors: Mitchell A. Nahmias, Menlo Park, CA (US); Michael Gao, Menlo Park, CA (US)

(73) Assignee: Luminous Computing, Inc., Menlo Park, CA (US)

( * ) Notice: Subject to any disclaimer, the term of this patent is extended or adjusted under 35 U.S.C. 154(b) by 91 days.

(21) Appl. No.: 17/313,917

(22) Filed: May 6, 2021

Related U.S. Application Data

(60) Provisional application No. 63/127,782, filed on Dec. 18, 2020, provisional application No. 63/036,219, filed on Jun. 8, 2020, provisional application No. 63/020,994, filed on May 6, 2020.

(51) Int. Cl.
 *G06E 3/00* (2006.01)
 *G02B 6/293* (2006.01)

(52) U.S. Cl.
 CPC ........... *G06E 3/008* (2013.01); *G02B 6/2935* (2013.01); *G02B 6/2938* (2013.01); *G02B 6/29301* (2013.01)

(58) Field of Classification Search
 CPC .. G06E 3/008; G02B 6/29301; G02B 6/2935; G02B 6/2938; G02B 6/12007; G02B 6/12004; G02B 6/29361; G06N 3/0675; G06N 3/0472; G06N 3/06; G06N 3/0635; G06N 3/067; G06N 3/084; G06J 1/005; G06J 1/02

See application file for complete search history.

(56) References Cited

U.S. PATENT DOCUMENTS

| | | | |
|---|---|---|---|
| 5,138,677 | A | 8/1992 | Oshaughnessy et al. |
| 6,137,604 | A | 10/2000 | Bergano |
| 6,452,681 | B1 | 9/2002 | Carver et al. |
| 6,529,276 | B1 | 3/2003 | Myrick |

(Continued)

OTHER PUBLICATIONS

Richardson, Julian , et al., "Flexible Generation of Kalman Filter Code", NASA Technical Reports Server (NTRS), Jan. 1, 2006.

(Continued)

*Primary Examiner* — Ryan A Lepisto
*Assistant Examiner* — Erin D Chiem
(74) *Attorney, Agent, or Firm* — Jeffrey Schox; Samuel James Rosenthal

(57) ABSTRACT

A system for parallel photonic computation, preferably including a source module, a plurality of input modulator units, an optical interference unit (OIU), and a plurality of detector banks. An OIU, preferably including one or more unitary matrix modules and optionally including a diagonal matrix module. An input modulator, which can include one or more waveguides, couplers, and/or modulator banks. A method for parallel photonic computing, preferably including encoding input vectors, performing a desired matrix operation, and receiving output values, and optionally including performing electronic computations and/or performing further optical computations based on the outputs, which can function to compute the results of a matrix operation on many different input vectors in parallel.

22 Claims, 23 Drawing Sheets

(56) References Cited

U.S. PATENT DOCUMENTS

| | | | |
|---|---|---|---|
| 6,825,963 | B2 | 11/2004 | Kittaka et al. |
| 7,005,669 | B1 | 2/2006 | Lee |
| 7,206,477 | B2 | 4/2007 | Madsen |
| 7,298,949 | B2 | 11/2007 | Gothoskar et al. |
| 7,310,454 | B2 | 12/2007 | Akiyama et al. |
| 7,310,468 | B2 | 12/2007 | Kittaka et al. |
| 7,474,408 | B2 | 1/2009 | Alphonse |
| 8,027,587 | B1* | 9/2011 | Watts .................. G02B 6/12007 359/107 |
| 9,831,957 | B2 | 11/2017 | Abiri et al. |
| 10,009,135 | B2* | 6/2018 | Tait .......................... H04B 10/80 |
| 10,133,141 | B2 | 11/2018 | Evans et al. |
| 10,763,974 | B2* | 9/2020 | Bunandar ............. G06N 3/0675 |
| 10,803,259 | B2* | 10/2020 | Kenney .................... G06F 17/16 |
| 11,143,822 | B1* | 10/2021 | Nahmias ............ G02B 6/29355 |
| 2004/0027646 | A1 | 2/2004 | Miller et al. |
| 2004/0114929 | A1 | 6/2004 | Madsen |
| 2004/0170351 | A1 | 9/2004 | Fishman et al. |
| 2004/0184711 | A1 | 9/2004 | Bradley et al. |
| 2005/0259999 | A1 | 11/2005 | Covey |
| 2010/0296775 | A1 | 11/2010 | Png et al. |
| 2017/0336564 | A1 | 11/2017 | Soref |
| 2019/0187380 | A1* | 6/2019 | Fanto ........................ G02B 6/26 |
| 2019/0199060 | A1 | 6/2019 | Parker et al. |
| 2019/0331912 | A1* | 10/2019 | Tait .......................... G02F 1/225 |
| 2021/0336414 | A1* | 10/2021 | Harris ........................ G02F 3/00 |

OTHER PUBLICATIONS

Clements, William R. et al., "Optimal design for universal multiport interferometers", Optica, vol. 3, No. 12, Dec. 2016, 6 pages.

Darmawan, S. et al., "Nested ring Mach-Zehnder interferometer" Optics Express, vol. 15, No. 2, Jan. 22, 2007.

Govdeli et al. "Integrated Optical Modulator Based on Transition between Photonic Bands", Scientific Reports | (2018) 8:1619 | DOI:10.1038/s41598-018-20097-7.

Gutierrez, A.M. "Ring-Assisted Mach-Zhnder Interferometer Silicon Modulator for Enhanced Performance" Journal of Lightwave Technology, vol. 30, No. 1, Jan. 1, 2012, 6 pages.

Hyeongpin Kim, Tailorable and Broadband On-Chip Optical Power Splitter, Appl. Sci. 2019, 9, 4239; doi:10.3390/app9204239.

Jin, Weiliang et al., "Inverse Design of Compact Multimode Cavity Couplers" Optics Express, vol. 26, No. 20, Oct. 1, 2018, 9 pages.

Jing Gao, Multi-function Mach-Zehnder modulator forpulse shaping and generation, vol. 24, No. 19 | Sep. 19, 2016 | Optics Express 22239.

Kocaman, S. et al. "Zero phase delay in negative-refractive-index photonic crystal superlattices" Nature Photonics | vol. 5 | Aug. 2011 | www.nature.com/naturephotonics.

Le, Trung-Thanh "New Approach to Mach-Zehnder Interferometer (MZI) Cell Based on Silicon Waveguides for Nanophonic Circuits", IntechOpen, 2018, 16 pages.

Liangjun Lu, Low-power 2×2 silicon electro-optic switches based on double-ring assisted Mac-Zehnder interferometers, Mar. 15, 2014 / vol. 39, No. 6 / Optics Letter.

Lu, Liangjun "Low-power 2X2 silicon electro-optic switches based on double-ring assisted Mach-Zehnder interferometers", Optic Letters, vol. 39, No. 6, Mar. 15, 2014, 4 pages.

Moazeni et al. "A 40-GB/s PAM-4 Transmitter Based on a Ring-Resonator Optical DAC in 45-nm SOI CMOS" IEEE Journal of Solid-State Circuits, vol. 52, No. 12, Dec. 2017.

Yichen, Articles: Deep learning with coherent nanophotonic circuits, Published Online: Jun. 12, 2017 | DOI: 10.1038/NPHOTON.2017.93.

Rosenberg, J. C. et al. "A 25 Gbps silicon microring modulator based on an interleaved junction" Nov. 19, 2012 / vol. 20, No. 24 / Optics Express.

S. Darmawan, Nested ring Mach-Zehnder interferometer, Jan. 22, 2007 / vol. 15, No. 2 / Optics Express.

Settle, Michael et al. "Low loss silicon on insulator photonic crystal waveguides made by 193nm optical lithography" Mar. 20, 2006 / vol. 14, No. 6 / Optics Express 2440.

Shainline, Jeffrey M. et al. "Depletion-mode carrier-plasma optical modulator in zero-change advanced CMOS", Aug. 1, 2013 / vol. 38, No. 15 / Optics Letters.

Song, Junfeng, et al. "Passive ring-assisted Mach-Zehnder interleaver on silicon-on-insulator" Optics Express, vol. 16., No. 12 Jun. 9, 2008, 7 pages.

Timurdogan, Erman "An Interior-Ridge Silicon Microring Modulator" Journal of Lightwave Technology, vol. 31, No. 24, Dec. 15, 2013, 8 pages.

Timurgan, Erman, "An Ultralow power athermal silicon modualor" Nature Communications, DOI: 10.1038/ncomms5008, published Jun. 11, 2014, 11 pages.

Xiao, Xi et al., "44-Gb/s Silicon Microring Modulators Based on Zigzag PN Junctions", IEEE Photonics Technology Letters, vol. 24, No. 19, Oct. 1, 2012, 3 pages.

Yichen Shen, Deep learning with coherent nanophotonic circuits, Nature Photonics, DOI: 10.1038/NPHOTON.201.

* cited by examiner

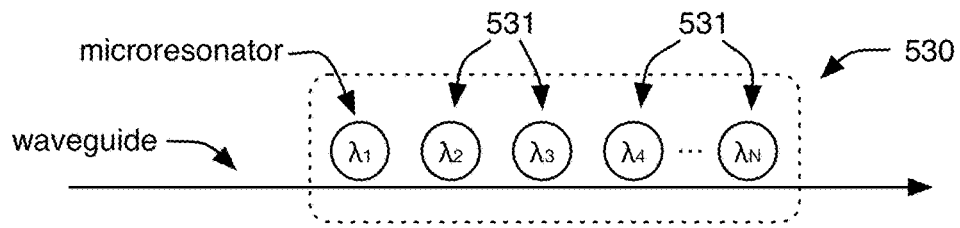
FIGURE 10A
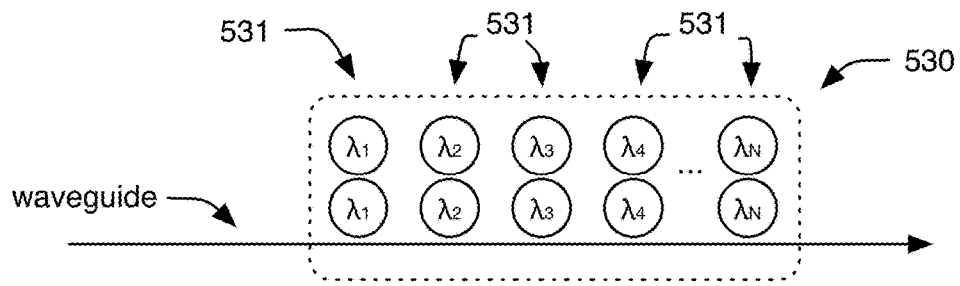
FIGURE 10B
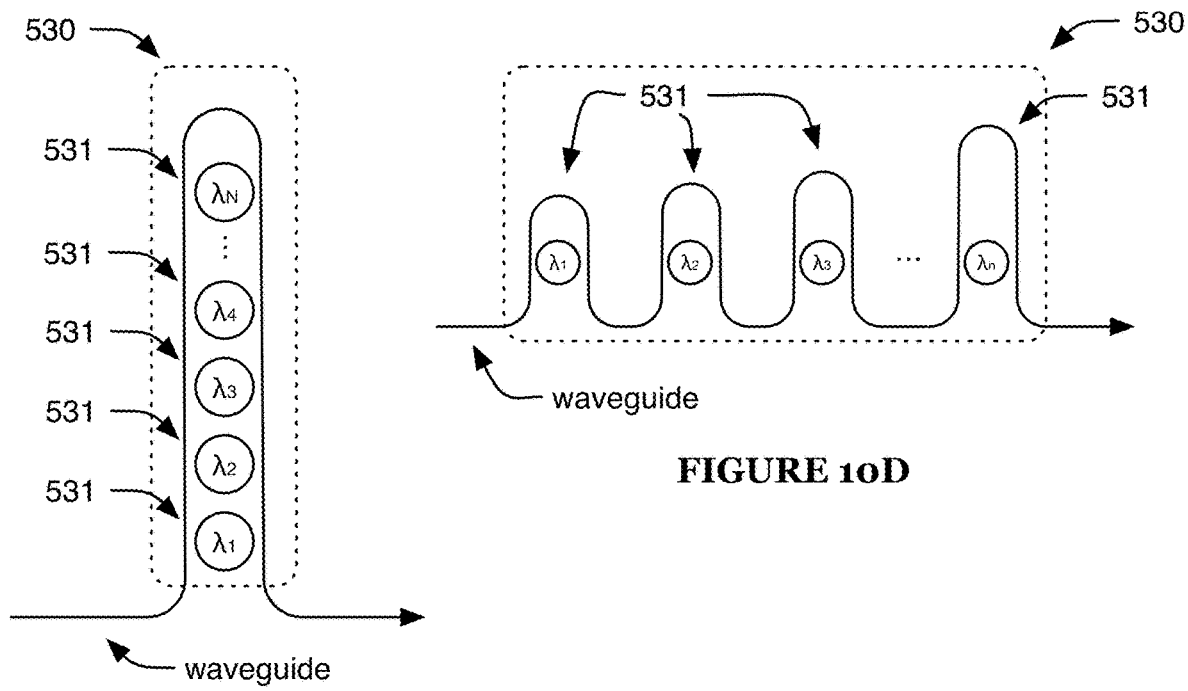
FIGURE 10C
FIGURE 10D

SYSTEM AND METHOD FOR PARALLEL PHOTONIC COMPUTATION

CROSS-REFERENCE TO RELATED APPLICATIONS

This application claims the benefit of U.S. Provisional Application Ser. No. 63/020,994, filed on 6 May 2020, U.S. Provisional Application Ser. No. 63/036,219, filed on 8 Jun. 2020, and U.S. Provisional Application Ser. No. 63/127,782, filed on 18 Dec. 2020, each of which is incorporated in its entirety by this reference.

TECHNICAL FIELD

This invention relates generally to the photonic computation field, and more specifically to a new and useful system and method for parallel photonic computation.

BACKGROUND

Many typical approaches to photonic computing require significant energy and/or device area, which can make these approaches unattractive as compared with more traditional (e.g., electronic) computing systems. Thus, there is a need in the photonic computation field to create a new and useful system and method for parallel photonic computation.

BRIEF DESCRIPTION OF THE FIGURES

FIGS. 10A-10D are schematic representations of a first, second, third, and fourth example, respectively, of a modulator bank.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
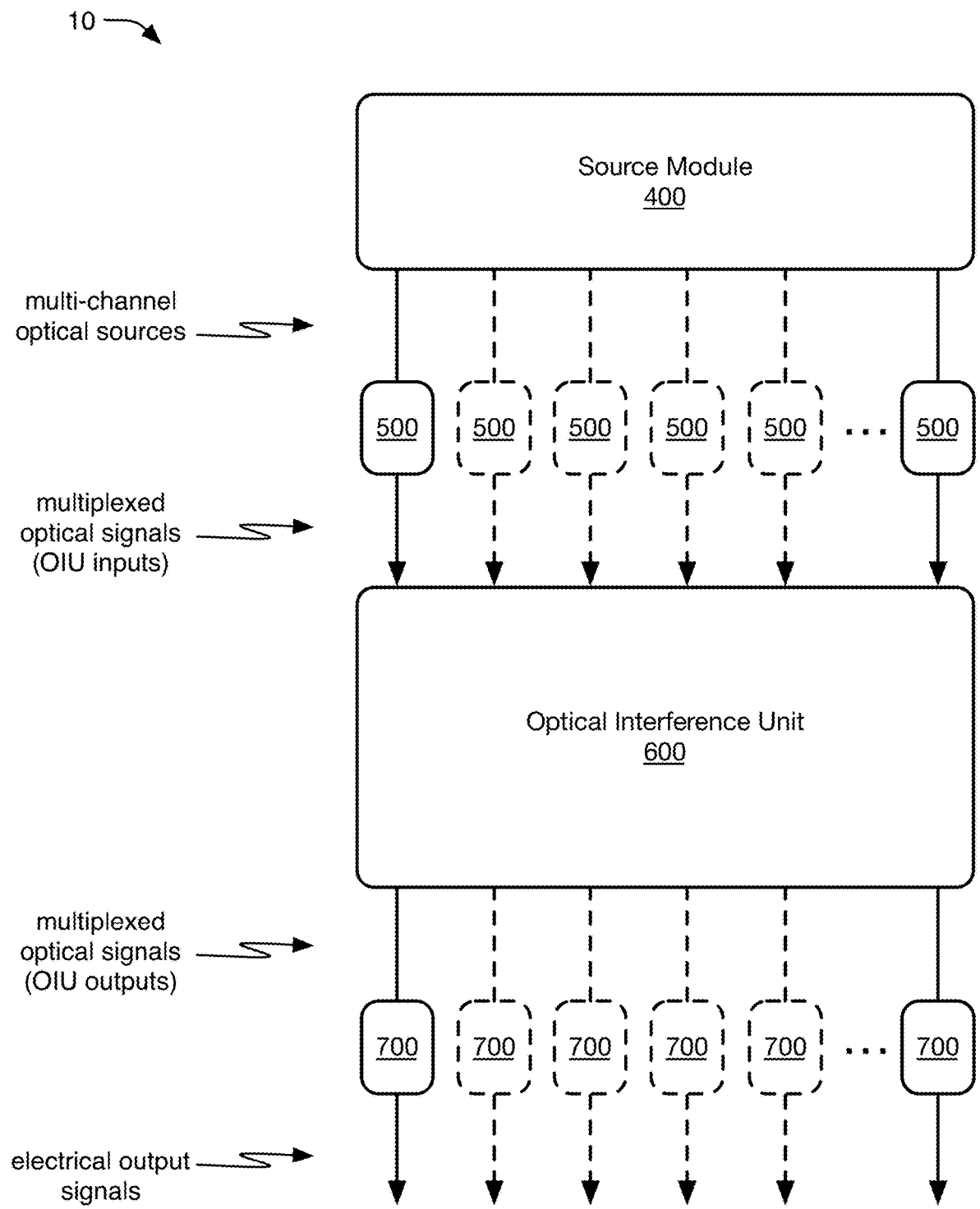
FIG. 1A is a schematic representation of an embodiment of a system for parallel photonic computation.
Figure 1B:
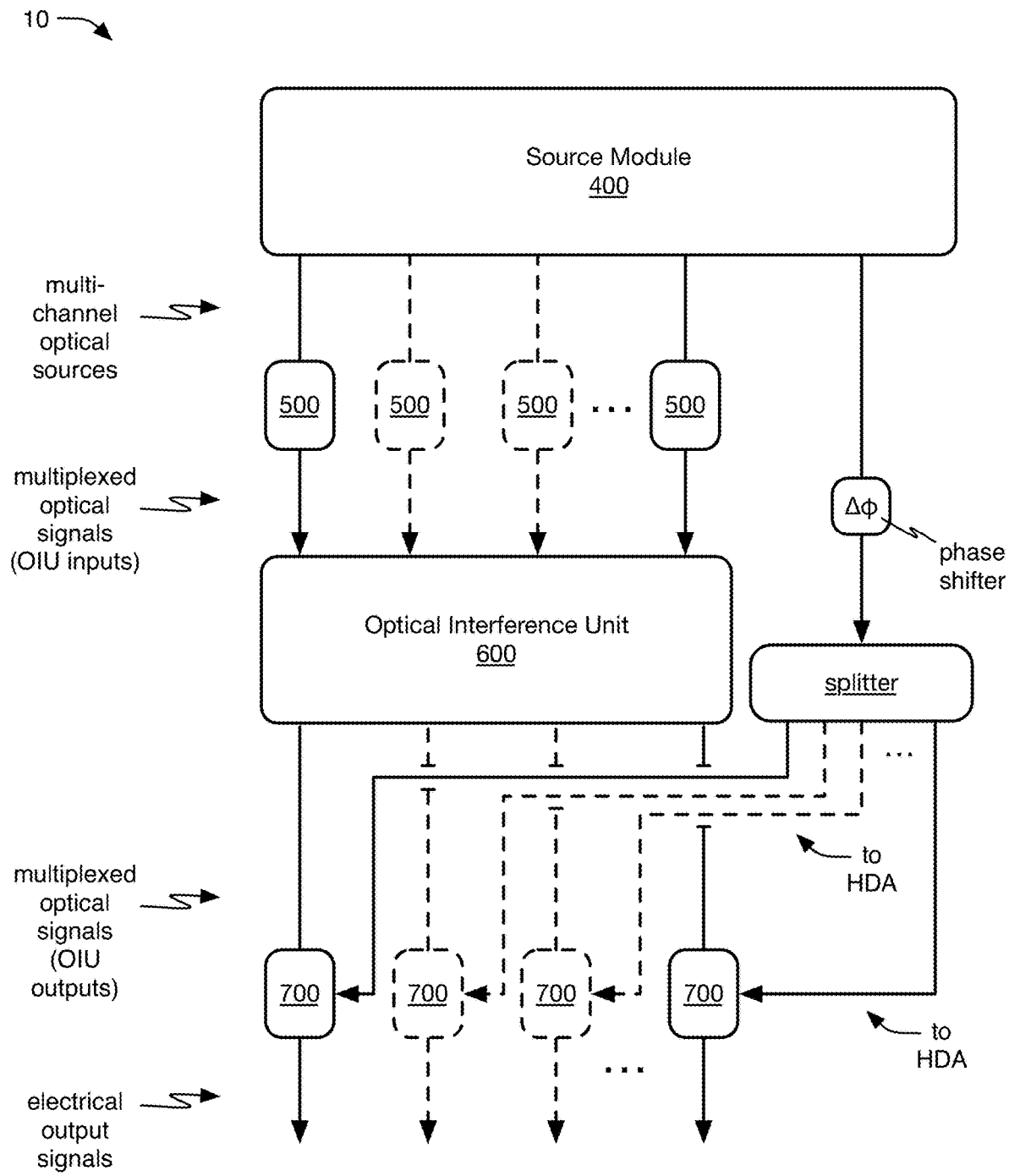
FIGS. 1B-1C are schematic representations of a first and second example, respectively, of a variant of the embodiment depicted in FIG. 1A.

A system 10 for optical computation preferably includes a source module 400, a plurality of input modulator units 500, an optical interference unit (OIU) 600, and a plurality of detector banks 700 (e.g., as shown in FIGS. 1A-1B). However, the system can additionally or alternatively include any other suitable elements.

1.1 Source Module.

Figure 2A:
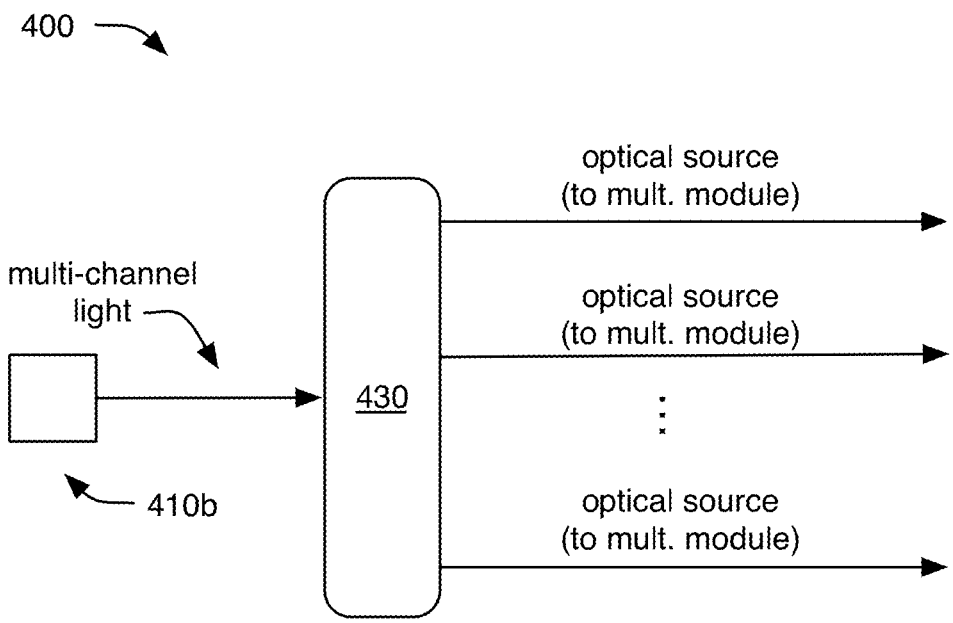
FIGS. 2A-2C are schematic representations of various embodiments of a source module of the system.
Figure 2B:
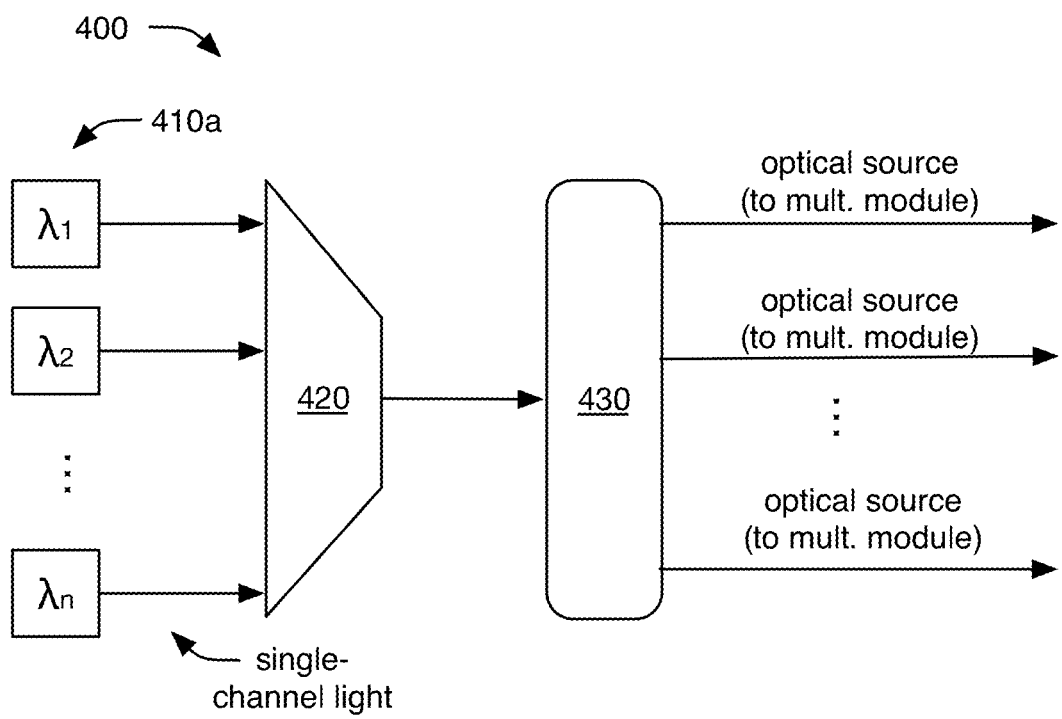
Figure 2C:
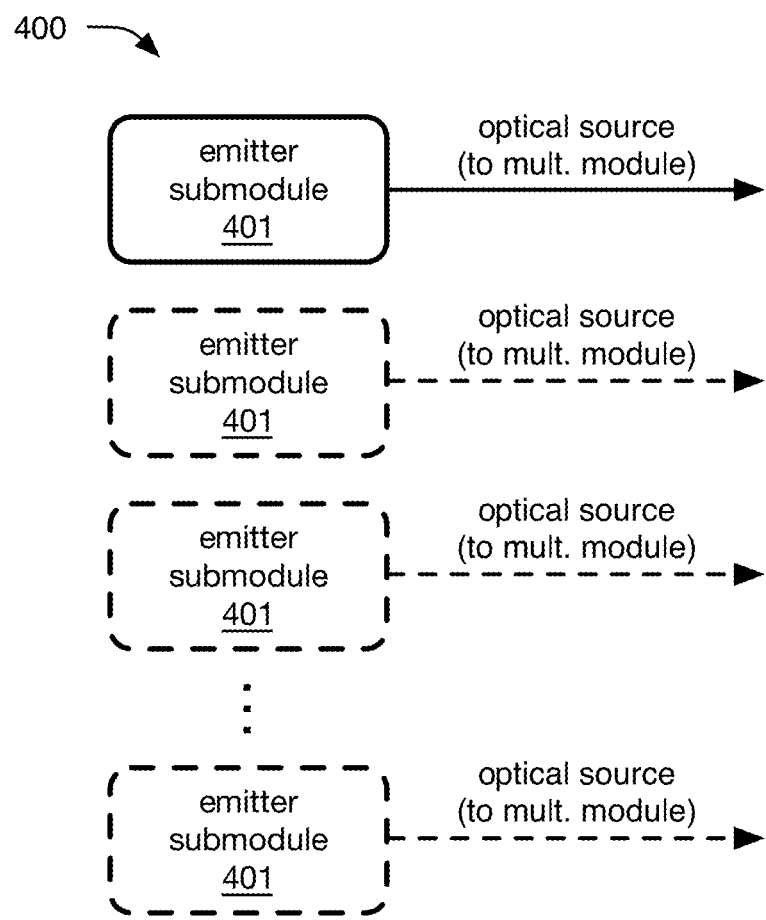

The source module 400 preferably functions to generate a plurality of multi-channel optical sources (e.g., as shown in FIGS. 2A-2C). The optical sources are preferably spatially-separated from each other, and are preferably substantially identical to one another (or substantially identical except for differences in overall intensity, such as wherein one source is attenuated compared to another, preferably attenuated substantially equally over all channels of the optical source). However, the multi-channel optical sources can additionally or alternatively include any other suitable optical sources. Each optical source preferably includes light of a plurality of optically-distinct channels (e.g., wavelengths, modes, etc.), such as described in more detail in Appendix B (e.g., regarding section B1). The light of each channel is preferably of substantially equal intensity to that of the other channels, but the channels of the optical source can alternatively have any other suitable intensity relationship. The source module can include one or more elements such as described in Appendix B, and can additionally or alternatively include any other suitable elements.

The number of optical sources generated by the source module is preferably equal to (or greater than, such as in embodiments in which the source module also provides optical sources to other elements of the system, such as other modulator banks) the number of optical inputs of the plurality of input modulator units (e.g., one optical input for each input modulator unit that includes a single input port, two optical inputs for each input modulator unit that includes two input ports, etc.). In some embodiments, the number of optical sources generated can additionally include an optical source (or multiple additional optical sources) for elements associated with homodyne detection (e.g., the homodyne detection arms described below in more detail) and/or any other suitable elements requiring an optical source.

1.2 Input Modulator Units.

The system preferably includes one input modulator unit 500 for each input of the optical interference unit. Each input modulator unit preferably accepts a multi-channel optical source (e.g., received from the source module), more preferably unmodulated light. Each input modulator unit preferably outputs a multiplexed optical signal, wherein the input modulator unit functions to modulate the channels of the optical source (e.g., independently modulate each channel). The input modulator units preferably exhibit phase-stable behavior, wherein the phase of light in the multiplexed optical signal is substantially unchanged by changes in modulation. Accordingly, the multiplexed optical signals generated by the different input modulator units of the system can exhibit a substantially fixed phase relationship, despite different and/or changing modulation between the different input modulator units.

The input modulator units can include one or more elements such as described in Appendix B, and can additionally or alternatively include any other suitable elements. The input modulator units preferably include wideband couplers (e.g., as described in Appendix B), but can additionally or alternatively include any other suitable couplers (or not include any couplers).

In a first embodiment, an input modulator unit includes a Mach-Zehnder interferometer (MZI) structure.

In a first variant of this embodiment, the input modulator unit includes two sets of microresonator-based modulators, one set on each arm of the MZI, wherein the two sets of modulators can be operated together to achieve phase-stable modulation (e.g., as described in U.S. Provisional Patent Application 63/036,219, filed 8 Jun. 2020 and titled "Spectral Modulation System and Method of Use", which is herein incorporated in its entirety by this reference, wherein input modulator unit can include the 'spectral modulation system 500' of U.S. Provisional Patent Application 63/036,219 or can include a subset of the elements thereof; as described in more detail in Appendix A).

In a second variant of this embodiment, the input modulator unit includes one or more photonic crystal-based sets of modulators (e.g., as described in U.S. patent application Ser. Nos. 16/921,475 and 16/921,529, both filed 6 Jul. 2020 and titled "Photonic Bandgap Phase Modulator, Optical Filter Bank, Photonic Computing System, and Methods of Use", each of which is herein incorporated in its entirety by this reference). In specific examples, the modulator bank can include a photonic crystal modulator bank on one or both arms of the MZI.

In a second embodiment, the input modulator unit includes a plurality of optical channel-specific amplitude shifters that exhibit substantially no phase shift with changes in modulation.

However, the input modulator unit can additionally or alternatively include any other suitable modulator structures in any suitable arrangement.

1.3 Optical Interference Unit.

Figure 3A:
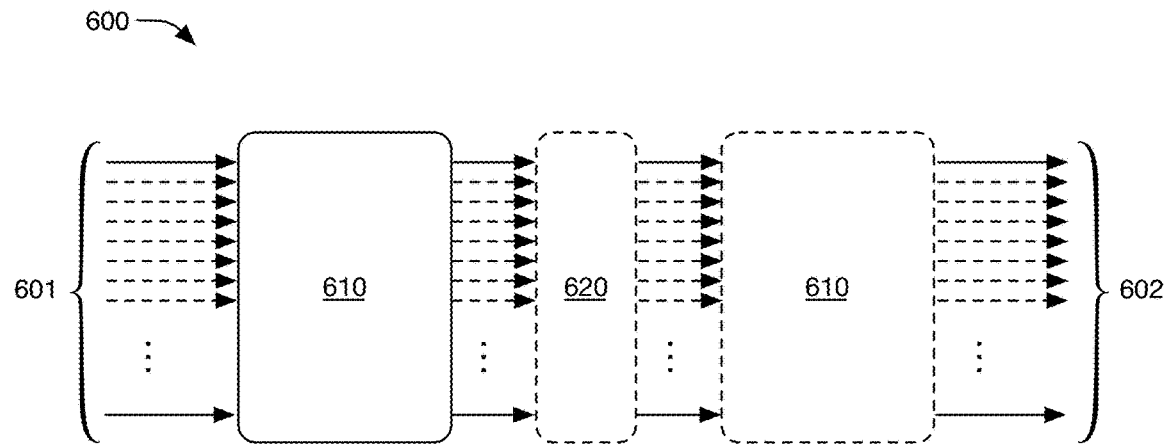
FIG. 3A is a schematic representation of an embodiment of an optical interference unit of the system.
Figure 3B:
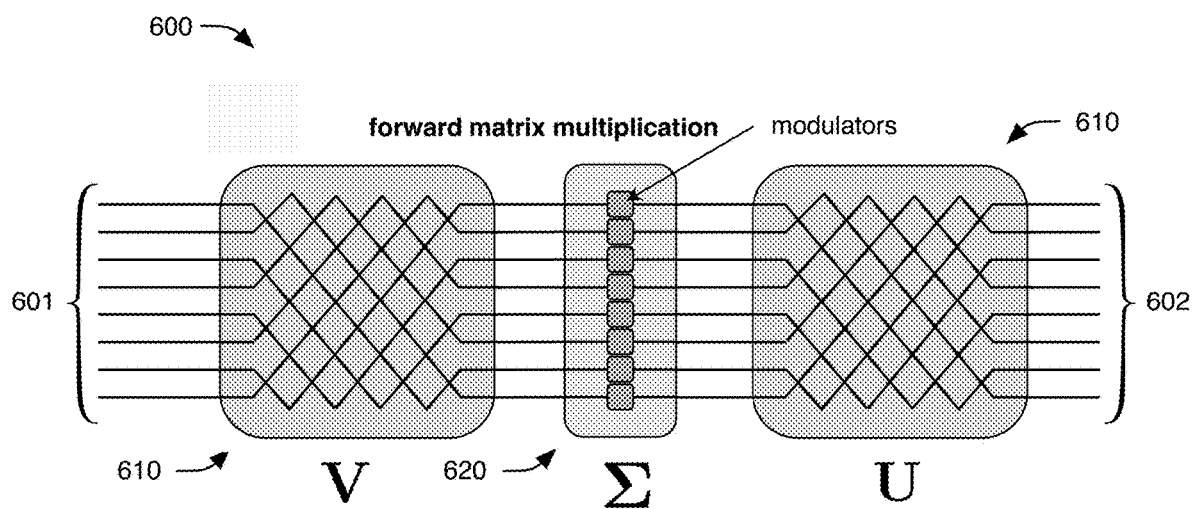
FIG. 3B is a schematic representation of an example of the optical interference unit depicted in FIG. 3A.

The optical interference unit 600 preferably includes a unitary matrix module (UMM) 610, and can optionally include a diagonal matrix module (DMM) 620, a second UMM 610, and/or any other suitable elements (e.g., as shown in FIGS. 3A-3B). In examples, the OIU can include one or more elements such as described in Shen, Y., Harris, N., Skirlo, S. et al., Deep learning with coherent nanophotonic circuits, *Nature Photon* 11, 441-446 (2017), DOI 10.1038/nphoton.2017.93, which is herein incorporated in its entirety by this reference.

The UMM preferably defines a plurality of inputs 601 (e.g., the inputs of the OIU) and a plurality of outputs 602 (more preferably, the same number of inputs and outputs). The UMM preferably functions to implement a unitary matrix multiplication of each vector represented by the received inputs, wherein the result of this multiplication is preferably a vector represented by the UMM outputs.

Figure 4A:
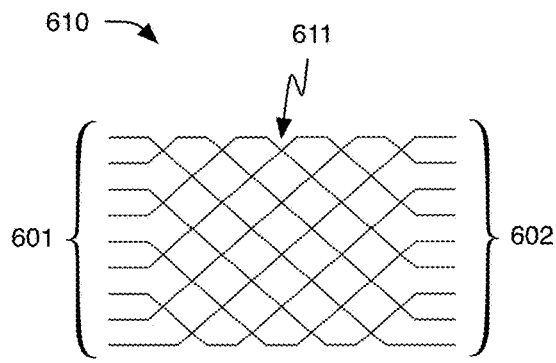
FIGS. 4A-4B are schematic representations of a first and second embodiment, respectively, of a unitary matrix module of the system.
Figure 4B:
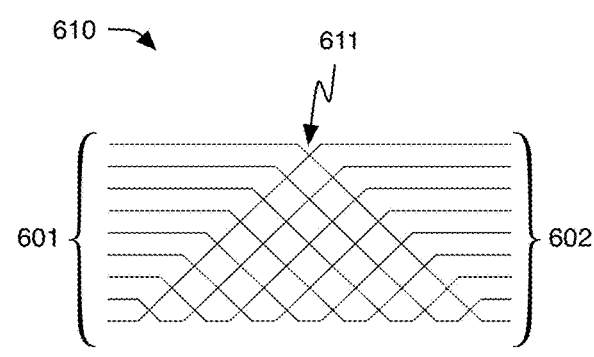
Figure 4C:
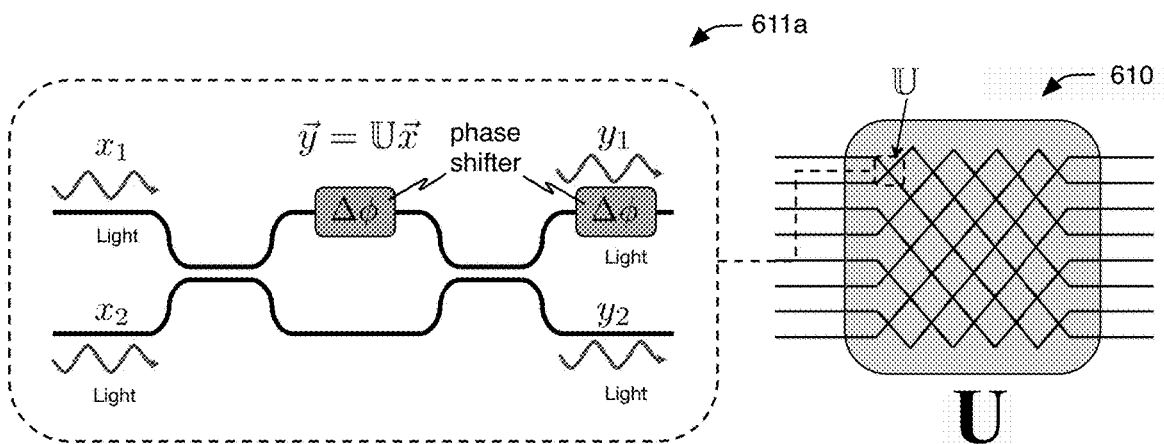
FIG. 4C is a schematic representation of an example of the unitary matrix module depicted in FIG. 4A.

Between the inputs and outputs, the UMM preferably defines a network of transform elements 611 (e.g., as shown in FIGS. 4A-4C, wherein each intersection depicted within the UMM represents a transform element), more preferably wherein each transform element (or a subset thereof) is an SU(2) transform element 611*a*. SU(2) is the special unitary group of degree 2 (i.e., the Lie group of 2×2 unitary matrices with determinant 1), and the SU(2) transform element is preferably operable to perform a vector-matrix multiplication transform (e.g., for element values represented by electric field strength) for any matrix of the group SU(2). This network of transform elements preferably implements the unitary matrix multiplication (e.g., wherein an arbitrary n×n unitary matrix multiplication can be implemented by a network of SU(2) transforms). In examples, the network can define a square unitary matrix decomposition network, a triangular unitary matrix decomposition network, and/or any other suitable network (e.g., as described in Shen, Y., Harris, N., Skirlo, S. et al., Deep learning with coherent nanophotonic circuits, *Nature Photon* 11, 441-446 (2017), DOI 10.1038/nphoton.2017.93, which is herein incorporated in its entirety by this reference). Each transform element preferably includes an MZI with an internal phase shifter and an external phase shifter (e.g., as shown in FIG. 4C). However, the UMM can additionally or alternatively include any other suitable elements in any suitable arrangement.

In embodiments including a DMM, the DMM preferably includes a plurality of optical attenuators, wherein each optical attenuator accepts a different output of the UMM and is configured to attenuate the output. The DMM preferably functions to implement a diagonal matrix multiplication of the vectors represented by the received outputs.

In embodiments including a second UMM, the second UMM preferably includes the same number of inputs as the first UMM. The second UMM preferably accepts inputs from the DMM. The second UMM preferably has the same (or substantially same) structure as the first UMM, but can alternatively have a different structure, such as wherein one UMM defines a triangular network and the other UMM defines a square network.

The OIU preferably operates substantially equally on all optical channels of the multiplexed optical input. Accordingly, the OIU can simultaneously apply the same matrix transform to each input vector represented by the multiplexed optical input (e.g., as described below regarding the method). For example, the OIU preferably includes wideband couplers (e.g., as described in Appendix B), but can additionally or alternatively include any other suitable couplers (or not include any couplers).

In variants, the system can include multiple optical interference units chained together, such as chained together optically (e.g., with no detectors in between the OIUs) and/or chained together optoelectronically (e.g., including electrical, electronic, and/or optoelectronic elements). In examples, the optoelectronic elements can include photodetectors, optical modulators, and/or any other suitable optoelectronic elements, and/or the electrical/electronic elements can include electrical and/or electronic circuits, electronic computing modules such as processors, and/or any other suitable electrical and/or electronic elements. These elements are preferably arranged between the OIUs (with respect to a photonic circuit topology), such as wherein these elements can receive output optical signals from one or more OIUs and/or provide input optical and/or electrical signals to one or more OIUs, which may be the same and/or different OIUs than the ones from which output light may be received. Such elements (e.g., electrical, electronic, and/or optoelectronic elements) can, in examples, transduce optical signals from one or more OIUs (and/or other elements of the system) into electrical and/or electronic signals, receive electrical and/or electronic signals from other elements of the system, modify the electrical and/or electronic signals (e.g., the transduced and/or received signals), provide the electrical and/or electronic signals (e.g., the transduced, received, and/or modified signals) to one or more OIUs, and/or transduce the electrical and/or electronic signals into optical signals to be provided to one or more OIUs. However, these elements can additionally or alternatively perform any other suitable functions.

In such variants, whether the OIUs are chained together optically or optoelectronically, the system can optionally include additional optical elements, such as non-linear optical elements, between the OIUs (e.g., which can function to modify the optical signals passed between the OIUs, such as by imposing non-linear effects on one or more of the signals).

However, the OIU can additionally or alternatively include any other suitable elements in any suitable arrangement, and/or can have any other suitable functionality.

1.4 Detector Bank.

Figure 1C:
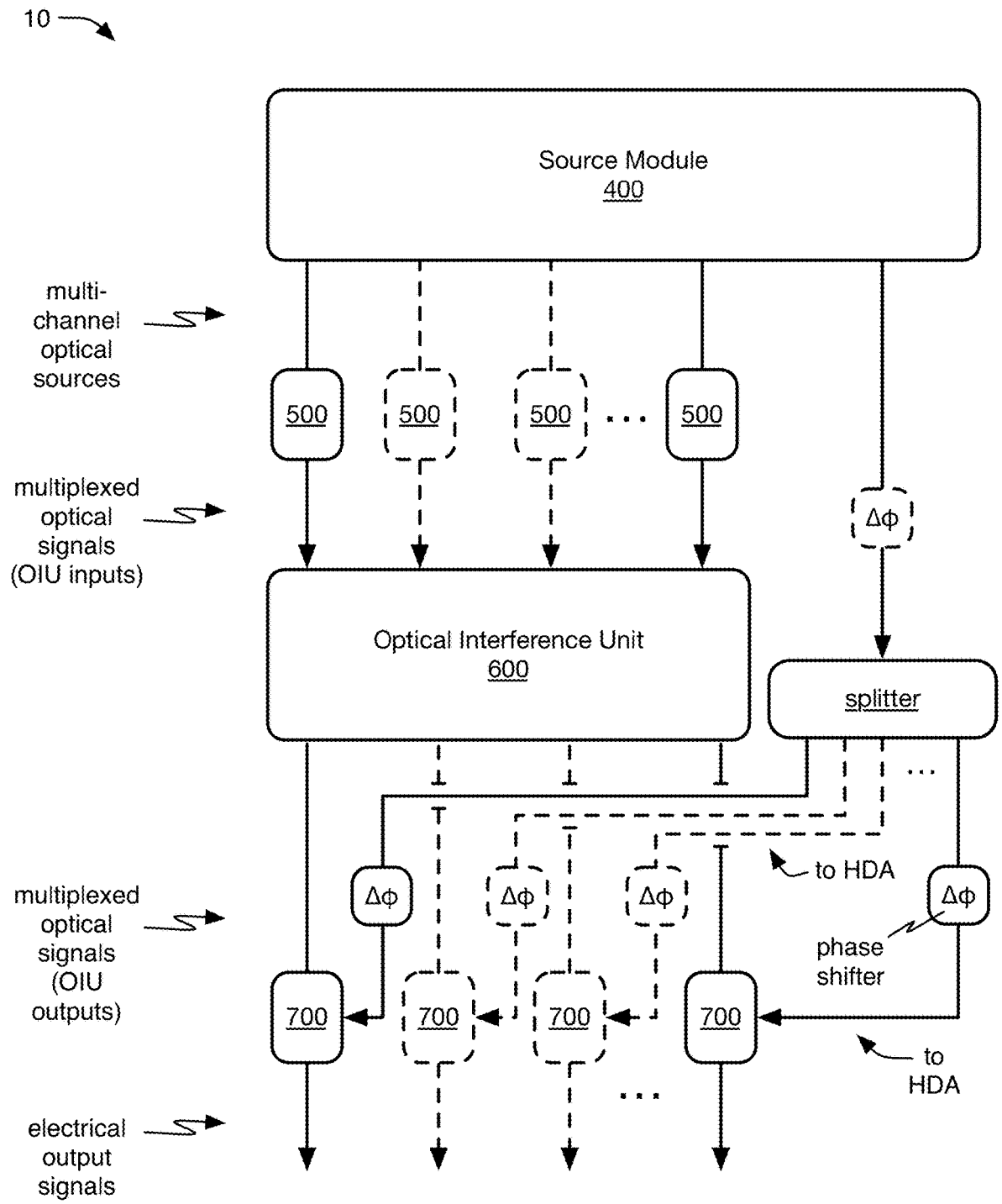

The system preferably includes one detector bank 700 for each output 602 of the OIU 600, wherein each detector bank can accept a different output from the OIU (e.g., as shown in FIGS. 1A-1C). Each detector bank preferably includes a demultiplexer 710 and one detector 720 (e.g., photodiode) for each optical channel (e.g., as shown in FIGS. 5A-5D).

The demultiplexer 710 preferably functions to spatially separate each optical channel of the output. The demultiplexer can include a grating, drop filters (e.g., microresonator-based filters), and/or any other suitable demultiplexing structures (e.g., as described in U.S. patent application Ser. No. 16/848,429, filed 14 Apr. 2020 and titled "System for Photonic Computing", which is herein incorporated in its entirety by this reference).

Each detector 720 preferably functions to transduce an optical signal (e.g., one of the spatially separated optical channels received from the demultiplexer) into an electrical signal. The electrical signal can be provided to an electronic computing system (e.g., processing unit, memory, etc.), can be used to control one or more optical computing units (e.g., the system, such as the input modulator units and/or OIU of the system, other optical computing systems, etc.), and/or can be used in any other suitable manner.

Figure 5A:
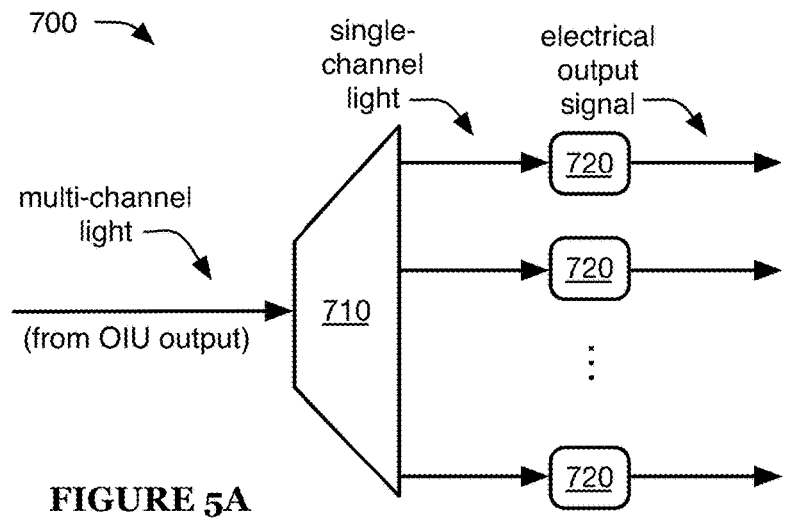
FIGS. 5A-5C are schematic representations of a first, second, and third embodiment, respectively, of a detector bank of the system.
Figure 5B:
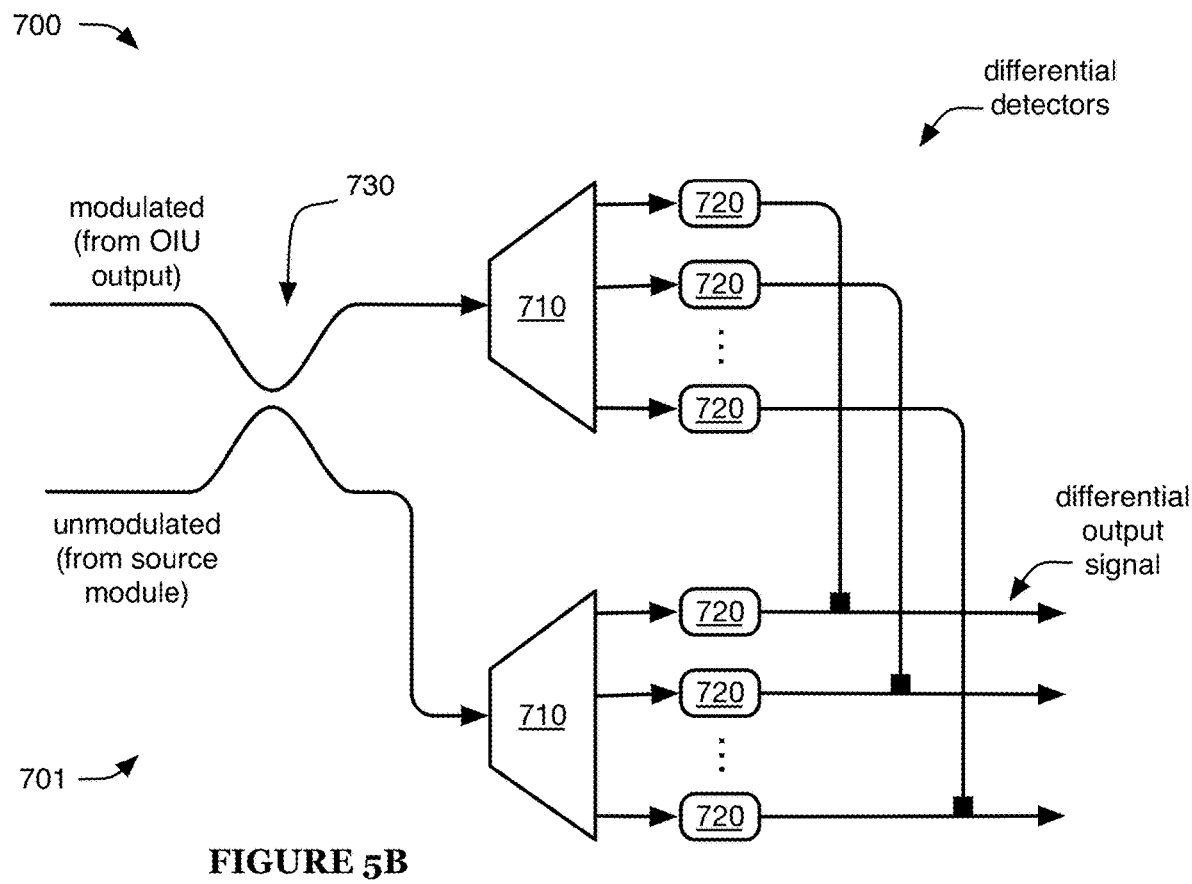
Figure 5C:
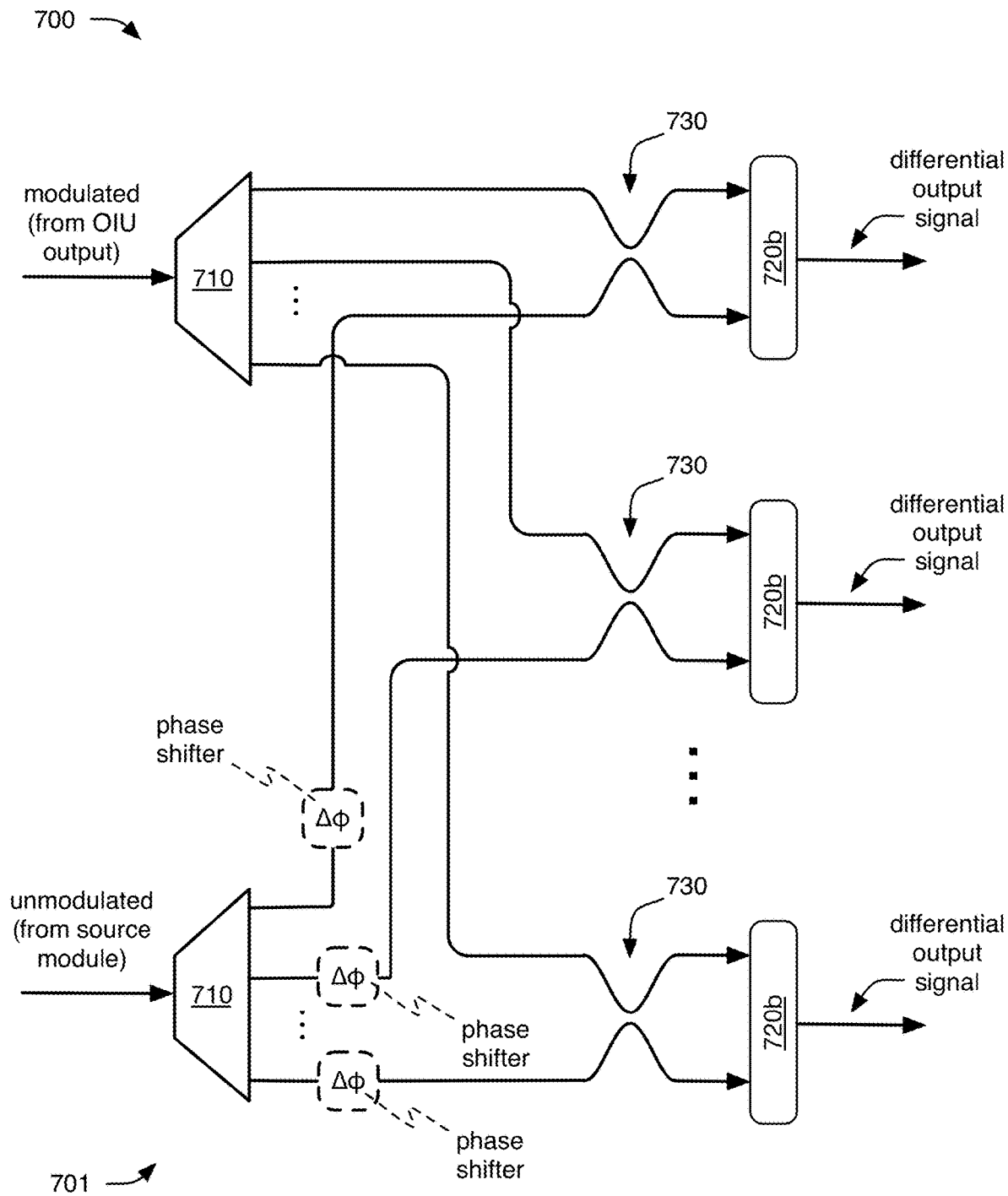
Figure 5D:
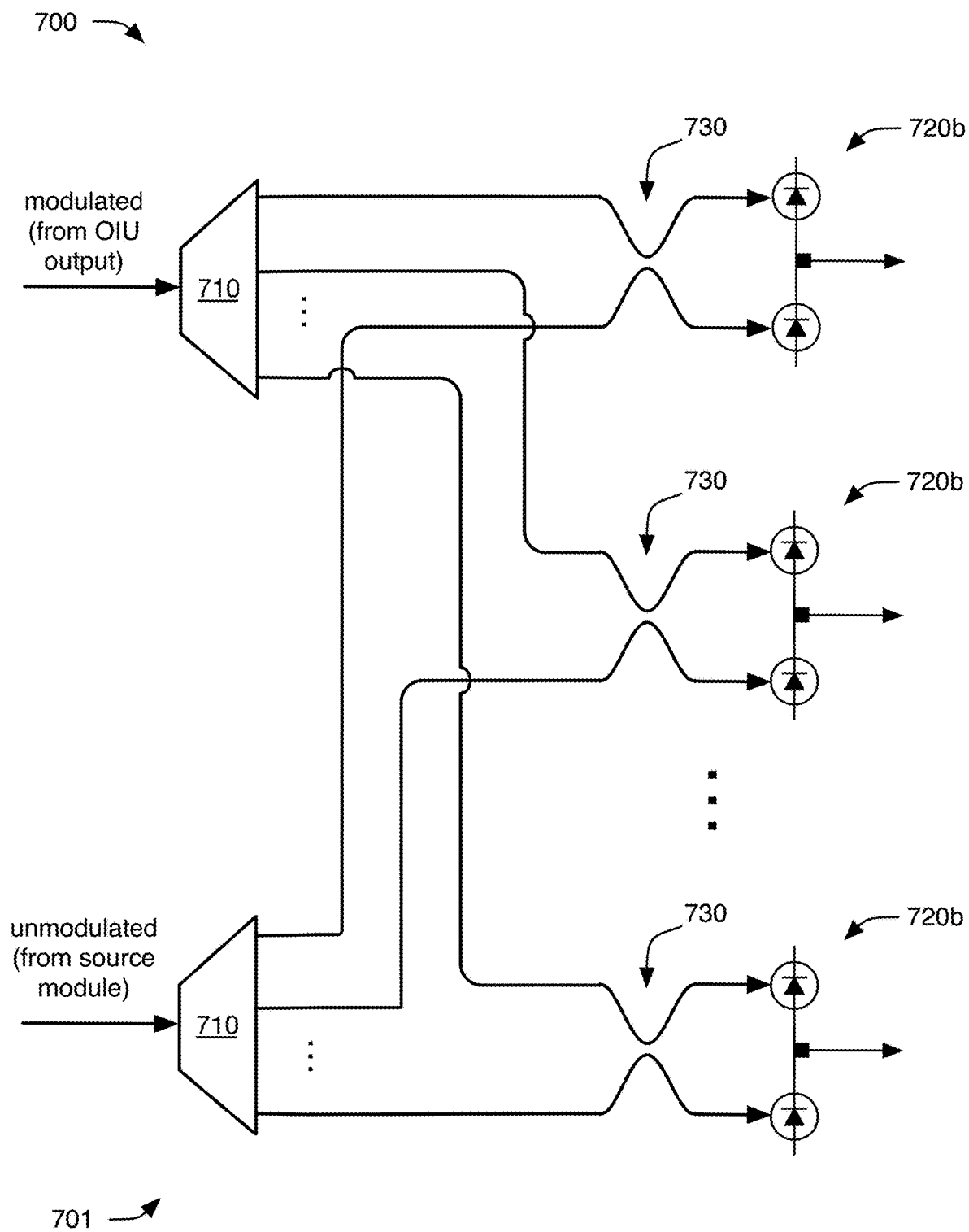
FIG. 5D is a schematic representation of an example of the detector bank depicted in FIG. 5C.

In some embodiments, the system (e.g., the detector banks thereof) can include one or more homodyne detection arms (HDAs) 701, such as shown by way of examples in FIGS. 5B-5D. In such embodiments, the multi-channel light (e.g., unmodulated multi-channel light before modulation at the input modulator units) can be split, wherein a portion is provided to the input modulator units and another portion is provided to the one or more HDAs (e.g., as shown in FIGS. 1B-1C). In such embodiments, the detector bank preferably optically couples the unmodulated light of the HDA with the modulated light received from the OIU. The HDA can include a demultiplexer 710 (e.g., as described above regarding the detector bank demultiplexer), one or more directional couplers 730, and a differential detector 720b that receives the optical channel from the directional coupler and transduces it into an electrical signal.

In a first embodiment, the unmodulated multi-channel light of the HDA is optically coupled (e.g., at the directional coupler) with the modulated multi-channel light of the OIU output 602, prior to demultiplexing (e.g., as shown in FIG. 5B). In this embodiment, the HDA preferably includes a single directional coupler, but can alternatively include a plurality. The directional coupler is preferably a wideband coupler (e.g., as described in Appendix B), but can additionally or alternatively include any other suitable couplers.

In a second embodiment, each optical channel of the HDA is separately coupled to the corresponding channel received from the OIU output 602 (e.g., after demultiplexing). For example, the HDA can include a plurality of directional couplers (e.g., each coupler receiving a different channel from the demultiplexer of the HDA and optically coupling that channel to the corresponding output channel of the detector bank), such as shown by way of example in FIGS. 5C-5D. In this embodiment, the couplers can be narrowband couplers, wideband couplers, and/or any other suitable optical couplers.

In a first example, the electrical signals of the primary detector and the differential detector are subtracted locally (e.g., wherein the photocurrents are subtracted directly, wherein photocurrents are transduced into voltage signals which are then subtracted, etc.). In a second example, a computing module (e.g., electronic computing module) receives values corresponding to both the signals from the primary detector and the differential detector and computes the difference with the signals. However, the differential detection can additionally or alternatively be achieved in any other suitable manner.

The HDAs can optionally include one or more phase shifters (e.g., compensation phase shifters) along one or more of the optical paths (e.g., before or after demultiplexing, preferably before optically coupling to the output channels), such as shown by way of examples in FIGS. 1B, 1C, and/or 5C. The phase shifters preferably function to compensate for undesired phase shifts (e.g., introduced due to thermal effects such as temperature fluctuations and/or temperature differences), to implement path length calibrations, and/or perform any other suitable functions. The compensation phase shifters can modulate the light slowly relative to the operation of the OIU (e.g., wherein the OIU includes modulators capable of modulating and/or configured to modulate the light at a substantially faster rate than the compensation phase shifter, such as faster by more than a factor of 3, 10, 20, 50, 100, etc.), but can alternatively operate at any suitable speed. The compensation phase shifter can include one or more electro-optic modulators, acousto-optic modulators, microresonator-based modulators, and/or any other suitable elements configured to controllably shift (e.g., in response to a control signal, such as an electrical signal that controls operation of the phase shifter) the phase of an optical signal propagating through and/or near (e.g., optically coupled to) the phase shifter. The phase shifter can include broadband shifter elements, narrowband shifter elements (e.g., overlapping the optical frequency of the optical signal to be phase shifted), and/or elements that operate on any other suitable optical frequency range(s).

In an alternate embodiment, the system can include a single detector bank 700 (rather than including a separate detector bank for each output 602). For example, the light from each output 602 can be combined (e.g., before demultiplexing at a single demultiplexer, after demultiplexing at a plurality of demultiplexers such as a number equal to the number of outputs, etc.), and the combined light can be provided to a single detector per optical channel (rather than a separate detector per optical channel for each output), thereby accumulating the calculated values.

However, the detector banks can additionally or alternatively include any other suitable elements.

2. Method.

Figure 12:
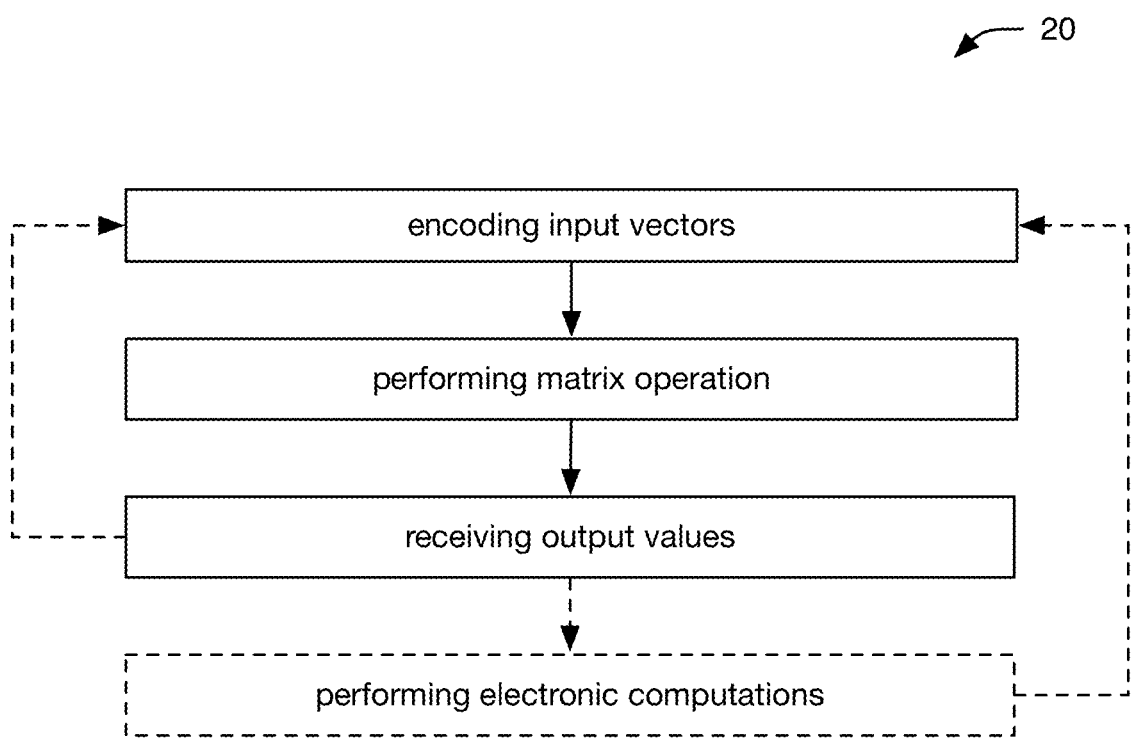
FIG. 12 is a schematic representation of an embodiment of a method for parallel photonic computation.

A method 20 for optical computing preferably functions to compute the results of a matrix operation on many different input vectors in parallel. The method preferably includes encoding the input vectors, performing a desired matrix operation, and receiving output values, and can optionally include performing electronic computations and/ or performing further optical computations based on the outputs (e.g., as shown in FIG. 12).

The method is preferably performed by the system described above, but can additionally or alternatively be performed with any other suitable systems.

2.1 Encoding Input Vectors.

Encoding the input vectors is preferably performed at the input modulator units. Each modulator bank properly encodes one element of each input factor. Each element is preferably encoded on a different optical channel (e.g., different wavelength channel). The value of each element is preferably represented by (e.g., substantially proportional to) the electric field strength (square root of optical power); accordingly, the optical power of a particular signal is preferably substantially proportional to the square of the value of the element represented by that signal. The different elements of a particular input vector are preferably encoded using the same optical channel at each input, but can alternatively be encoded using different optical channels at the different inputs.

The optical channels are preferably modulated in a phase-stationary manner (e.g., wherein changes in amplitude modulation do not substantially affect the phase of the modulated light). However, the optical channels can alternatively be modulated in any other suitable manner in which phase and amplitude modulation are partially or fully decoupled, or can be modulated in any other suitable manner.

Encoding the input vectors is preferably performed using an embodiment of the input modulator unit that includes two modulator banks (e.g., microresonator-based modulator banks), one arranged on each waveguide (e.g., as described below in Appendix A). Each modulator bank preferably includes a modulator element associated with a different optical channel to be modulated (wherein the two modulator banks cooperatively define a plurality of modulator element pairs, each pair including one modulator element from each modulator bank, both modulator elements of the pair associated with the same optical channel).

For each optical channel to be modulated, encoding the input vectors can include cooperatively tuning the resonance of the two modulator elements of the associated pair, in order to achieve the desired overall amplitude modulation (e.g., and cause substantially no change in phase with changing amplitude modulation, and achieve a desired phase modulation effect independent of amplitude modulation, etc.). In embodiments in which substantially phase-stationary behavior is desired, encoding the input vectors can include symmetrically tuning the resonance of the two modulator elements to opposite sides of the resonance peak (for a characteristic wavelength of the optical channel, such as the central wavelength, the wavelength of highest optical intensity, the average wavelength of light within the channel, etc.). This symmetrical tuning approach can be used to achieve substantially equal amplitude modulation (and accordingly, for substantially equivalent inputs, substantially equal output amplitudes) on the two waveguides, with substantially equal and opposite phase shifts (relative to a reference value, such as the phase shift when tuned to the resonance peak).

Figure 13:
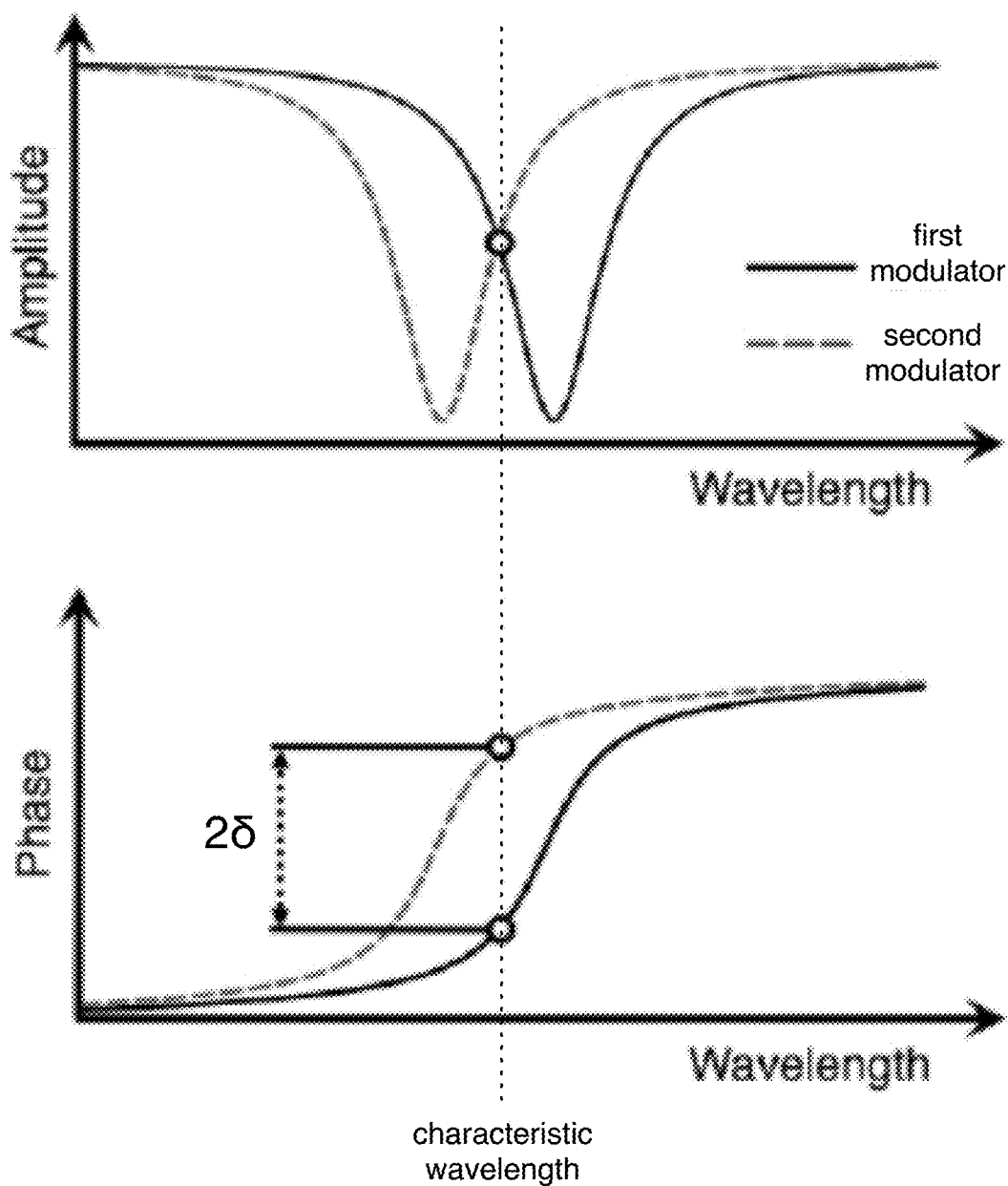
FIG. 13 is a schematic representation of an example of modulator tuning in an variant of the method.

In one example (e.g., in which the modulator elements are microresonators, such as microdisks), the magnitude of the phase shift imposed by a modulator element tuned to the resonance peak is q, and the output amplitude of the modulated light is reduced to a minimum value (e.g., substantially zero). In this example, to achieve higher output amplitudes, the pair of modulator elements can be tuned in opposite directions from the resonance peak. The modulator elements are preferably tuned symmetrically, such that the imposed phase shifts are $\pi+\delta$ and $\pi-\delta$, respectively (e.g., for some value $\delta \leq \pi$), such as shown by way of example in FIG. 13. Assuming a substantially symmetric transmission coefficient vs. phase shift relationship for the modulator elements and a substantially equal input intensity (of light of the associated optical channel) in both waveguides before modulation, the output amplitudes on each waveguide will be substantially equal under these conditions. Equal output amplitudes on the waveguides, with phase shifts symmetric about a constant reference value (e.g., about $\pi$), will result in a phase-stationary final output after passing through the output coupler (e.g., with amplitude proportional to cos $\delta$). Such symmetric tuning can be performed independently for each pair of modulator elements, thereby enabling independent phase-stationary amplitude modulation of each optical channel.

However, encoding the input vectors can additionally or alternatively include tuning the modulator banks in any other suitable manner to achieve any other suitable phase and/or amplitude modulation.

2.2 Performing a Matrix Operation.

The matrix operation is preferably performed at the OIU. The OIU preferably performs the matrix operations simultaneously on each input vector encoded at the input modulator units. For example, signals corresponding to all such input vectors can propagate simultaneously through the OIU and be acted on in substantially the same manner by the OIU. In some examples, the matrix operation is performed such as described in Shen, Y., Harris, N., Skirlo, S. et al., Deep learning with coherent nanophotonic circuits, *Nature Photon* 11, 441-446 (2017), DOI 10.1038/nphoton.2017.93, which is herein incorporated in its entirety by this reference (e.g., wherein the OIU performs one or more unitary matrix multiplications and/or diagonal matrix multiplications such as described in Shen et al.). However, the matrix operation(s) can additionally or alternatively be performed in any other suitable manner.

2.3 Receiving Output Values.

Receiving output values is preferably performed at the detector banks. For example, each detector bank preferably receives one element of each output vector from the OIU and transduces the elements into electrical signals. However, the output values can additionally or alternatively be received in any other suitable manner.

2.4 Performing Electronic Computations.

The method can optionally include performing electronic computations, such as performing computations based on the electrical signals received from the detector banks. For example, this can include performing diagonal matrix multiplication operations (e.g., wherein each element is multiplied by a corresponding element of the diagonal of the matrix), non-linear operations (e.g., wherein each element is scaled independently based on a non-linear function, wherein elements are scaled based on a multi-variate non-linear function, etc.), and/or any other suitable operations.

2.5 Performing Further Optical Computations.

The method can optionally include performing further optical computations based on the output values. For example, the method can include encoding the output values and/or derivatives thereof (such as derivatives computed electronically) as input vectors for a subsequent matrix operation. The matrix operation can then be performed at the OIU.

Figure 14A:
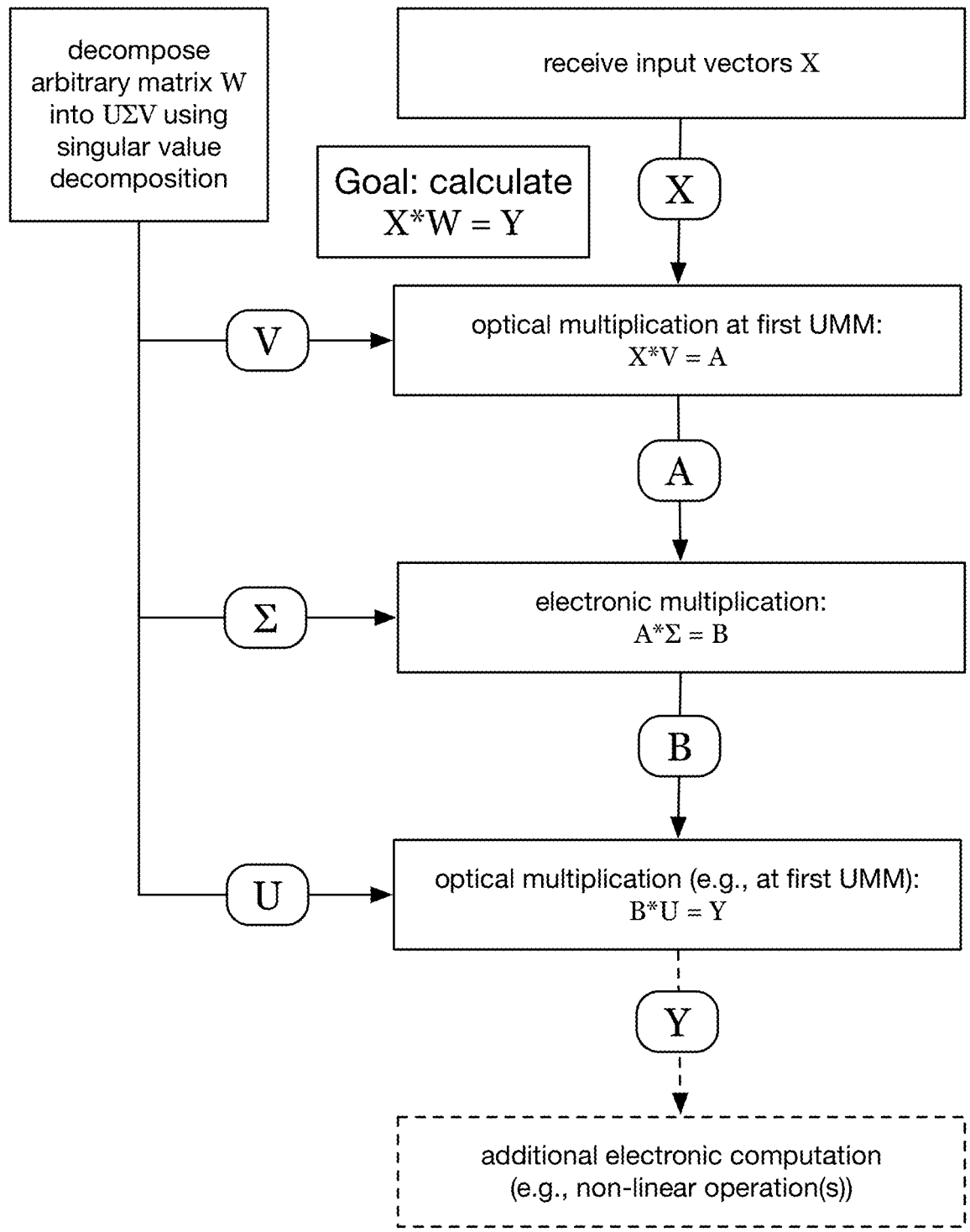
FIGS. 14A-14C are schematic representations of a first, second, and third example, respectively, of the method.

In a first embodiment (e.g., as shown in FIG. 14A), in which the OIU includes a single UMM and no DMM, the method can include, in a first optical computation iteration, performing a first unitary matrix multiplication on a set of input vectors, then electronically performing a diagonal matrix multiplication on each output vector from the first optical computation iteration, and then, in a second optical computation iteration, performing a second unitary matrix multiplication (e.g., at the UMM, at a different UMM such as a UMM of a different OIU, etc.) on the results of the electronic diagonal matrix multiplication, thereby computing an arbitrary matrix multiplication on each of the original input vectors. In variations of this embodiment, the method can further include electronically (and/or optically) performing one or more operations (e.g., non-linear operations) on the result of this arbitrary matrix multiplication, and then performing additional iterations (of any or all of the optical and/or electronic operations described regarding this embodiment), analogous to the repetition described below regarding the second embodiment.

Figure 14B:
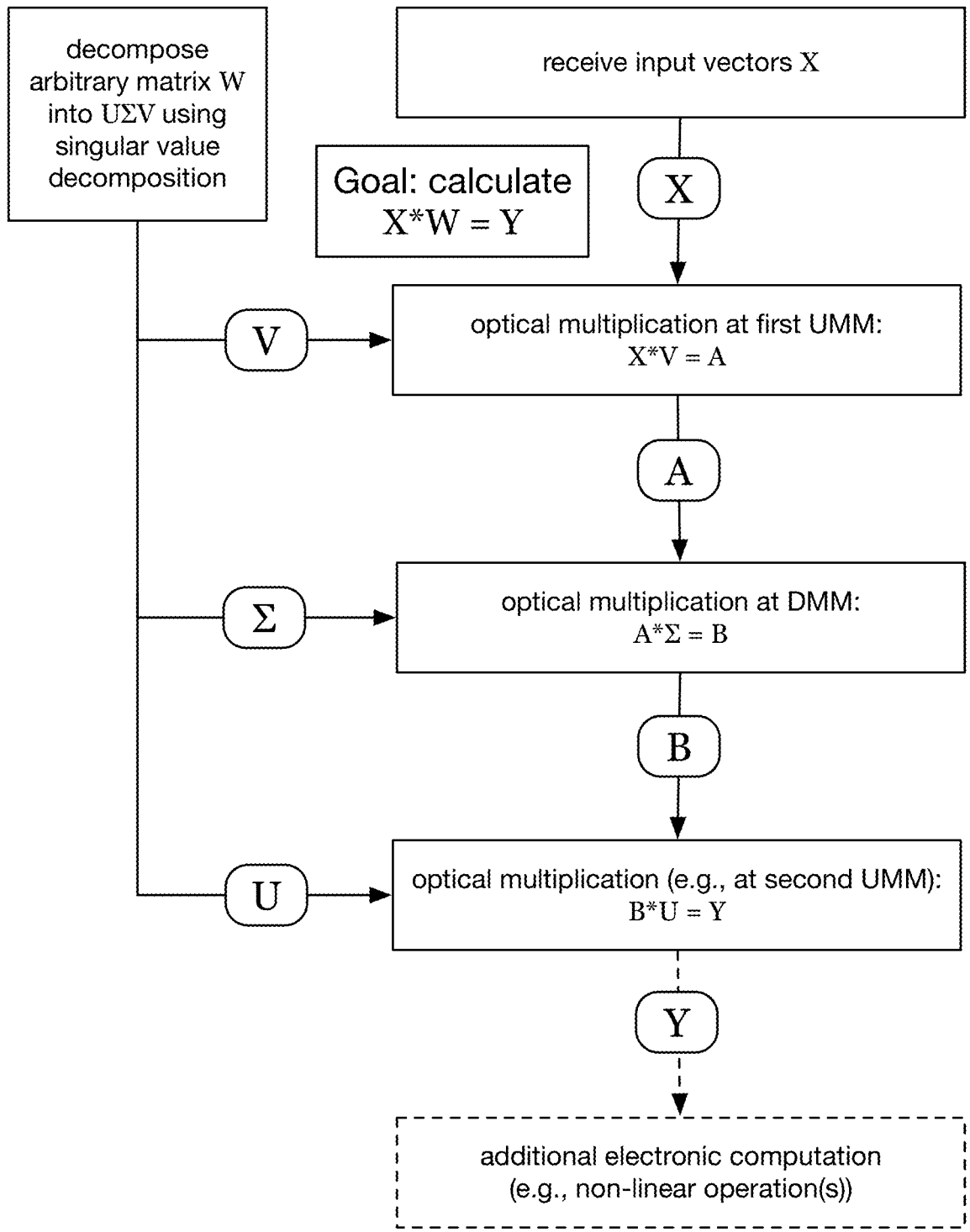

In a second embodiment (e.g., as shown in FIG. 14B), in which the OIU includes a first UMM, a DMM, and a second UMM, the method can include (e.g., in a first optical computation iteration) performing a first arbitrary matrix multiplication on each of the input vectors (e.g., by optically performing a first unitary matrix multiplication at the first UMM, then a diagonal matrix multiplication at the DMM, then a second unitary matrix multiplication at the second UMM). This embodiment can then optionally include electronically (and/or optically) performing one or more operations (e.g., non-linear operations) on the output of the first optical computation, and/or performing additional iterations (e.g., of optical matrix multiplication, optionally followed by electronic and/or optical non-linear operations) to compute additional matrix multiplications as desired.

Figure 14C:
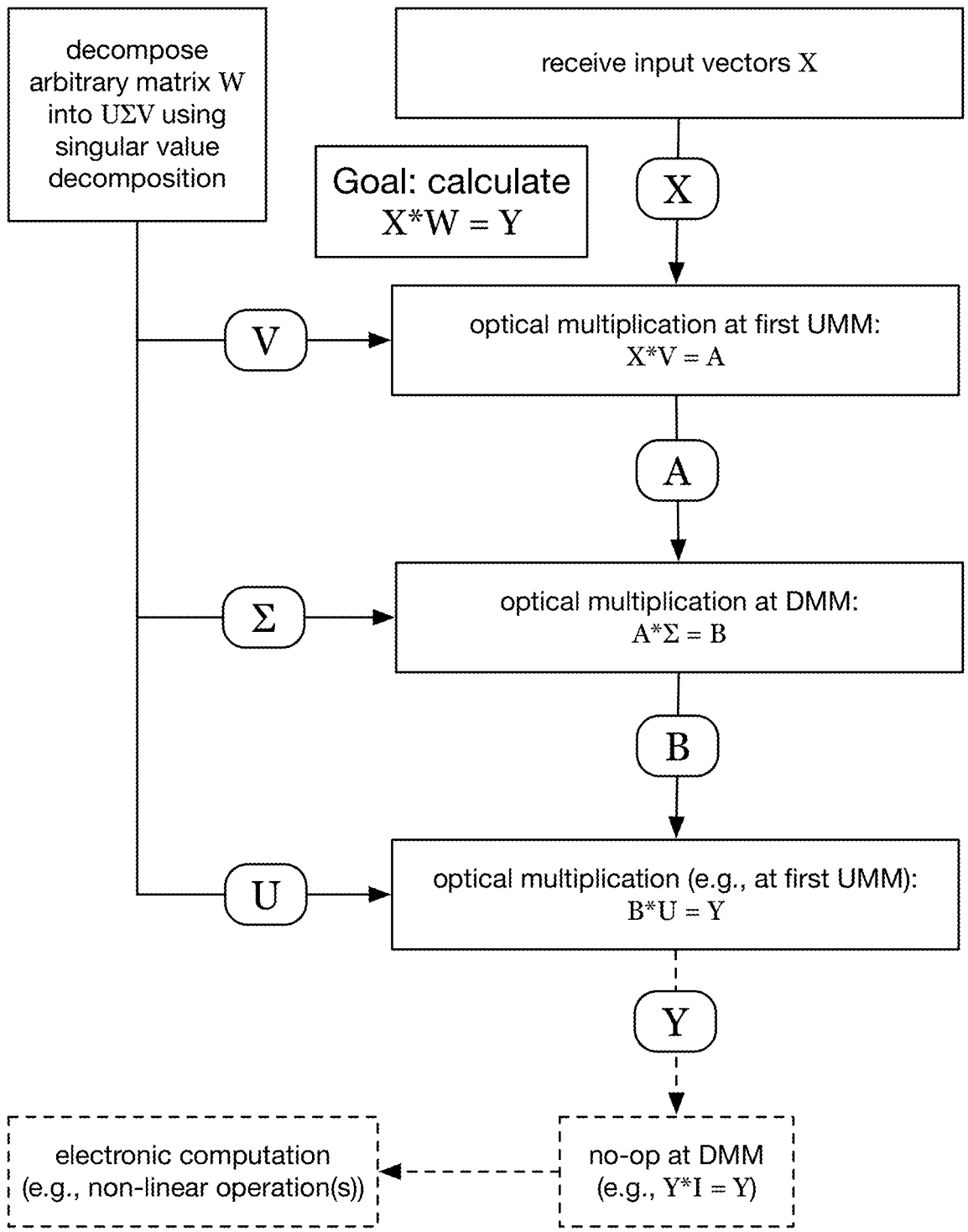

In a third embodiment (e.g., as shown in FIG. 14C), in which the OIU includes a single UMM and a DMM, the method can include (e.g., in a first optical computation iteration) optically performing a first unitary matrix multiplication on a set of input vectors at the UMM, then optically performing a diagonal matrix multiplication on each output vector from the first optical computation iteration at the DMM, and then, in a second optical computation iteration, performing a second unitary matrix multiplication (e.g., at the UMM, at a different UMM such as a UMM of a different OIU, etc.) on the results of the electronic diagonal matrix multiplication, possibly followed by a no-op pass through the DMM (e.g., wherein the diagonal matrix is the identity matrix I) which may be required due to the optical path (e.g., waveguide) configuration of the OIU, thereby computing an arbitrary matrix multiplication on each of the original input vectors. In variations of this embodiment, the method can further include electronically (and/or optically) performing one or more operations (e.g., non-linear operations) on the result of this arbitrary matrix multiplication, and then performing additional iterations (of any or all of the optical and/or electronic operations described regarding this embodiment), analogous to the repetition described above regarding the second embodiment.

However, the method can additionally or alternatively include any other suitable elements performed in any suitable manner.

Appendix A: Exemplary Input Modulator Unit Variant.

Figure 6:
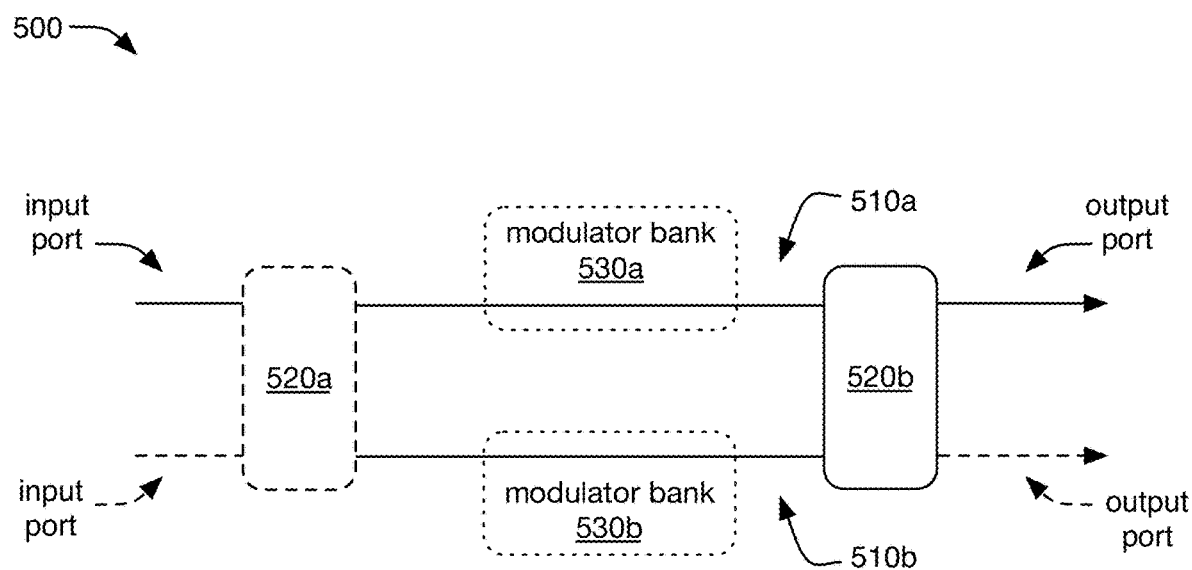
FIG. 6 is a schematic representation of an embodiment of an input modulator unit of the system.

A variant of an input modulator unit 500 can include one or more waveguides 510, couplers 520, and/or modulator banks 530 (e.g., as shown in FIG. 6), but can additionally or alternatively include any other suitable elements. This variant of the input modulator unit can function to enable independent amplitude modulation of a plurality of optical channels, preferably enabling phase-stationary amplitude modulation and/or otherwise enabling the decoupling of phase and amplitude modulation. In this variant, the input modulator unit preferably defines a Mach-Zehnder interferometer (MZI) structure.

A1. Waveguides.

Figure 7A:
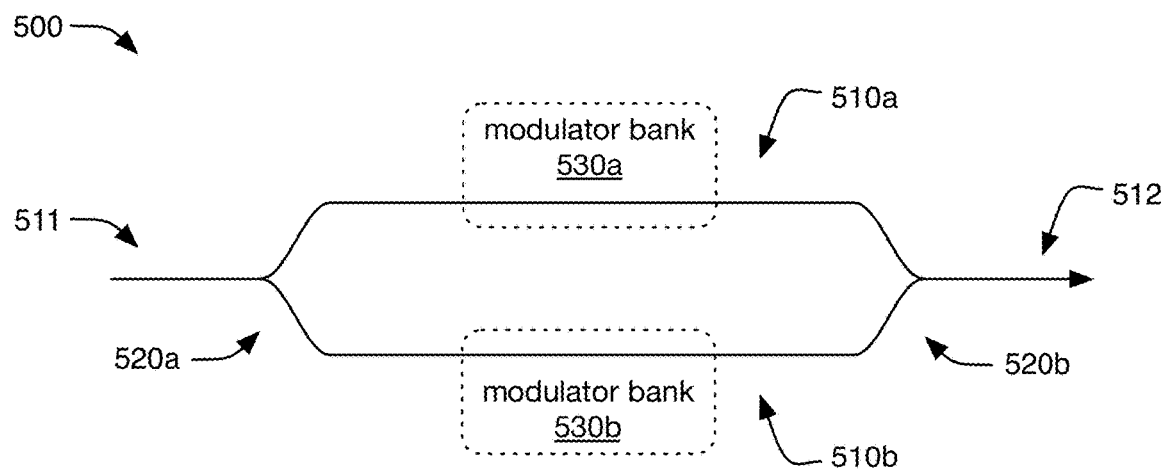
FIGS. 7A, 7B, 8A, 8B, 9A, and 9B are schematic representations of various examples of an input modulator unit of the system.
Figure 7B:
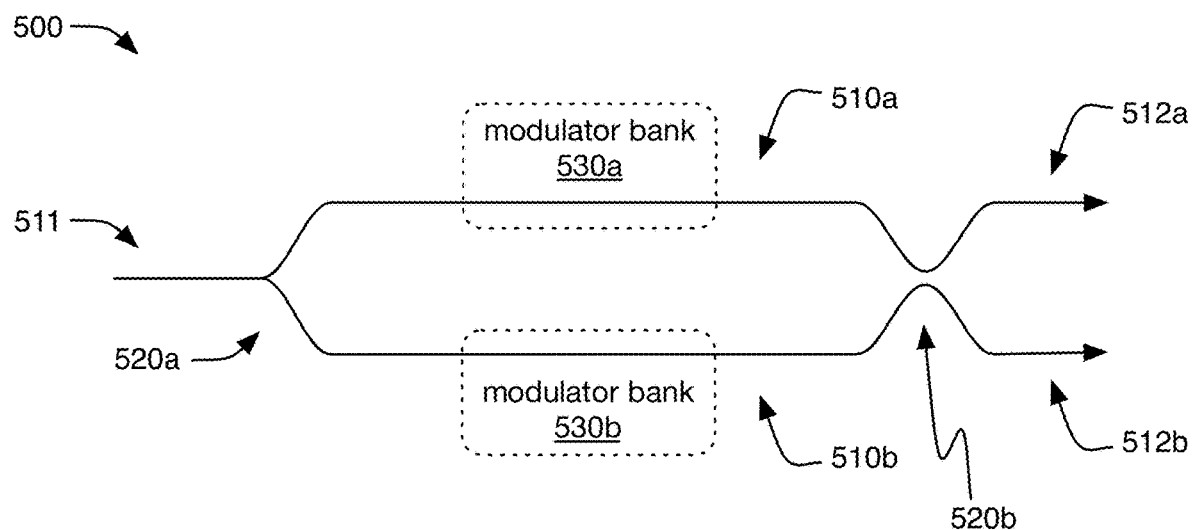
Figure 8A:
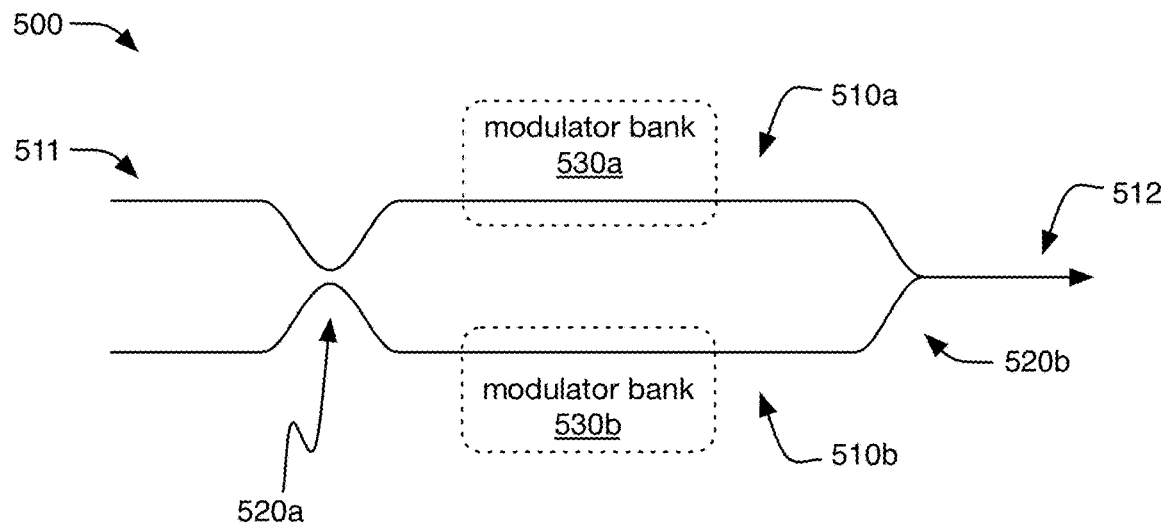
Figure 8B:
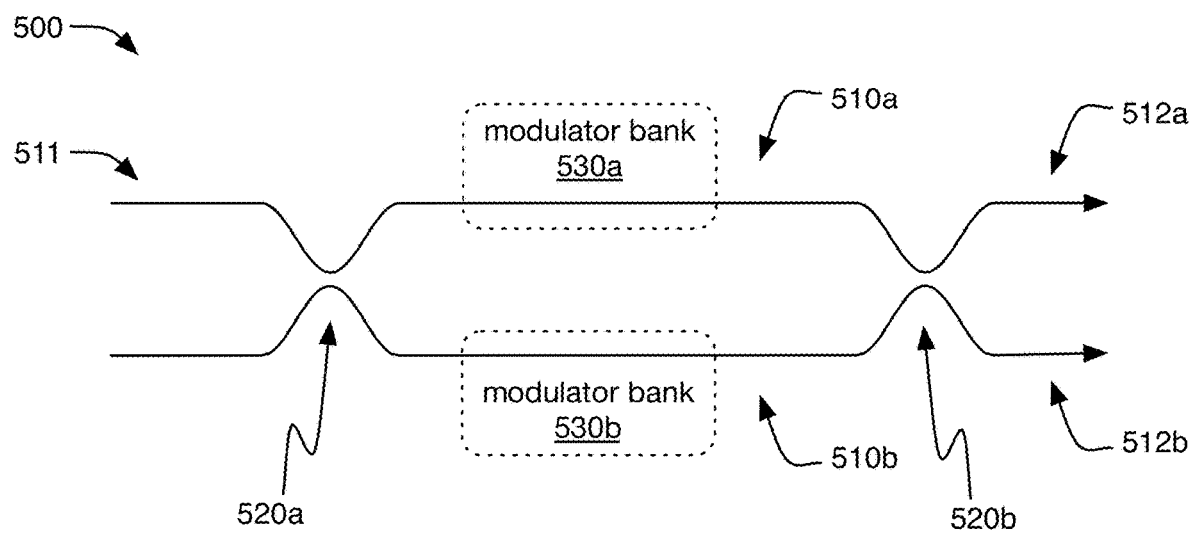
Figure 9A:
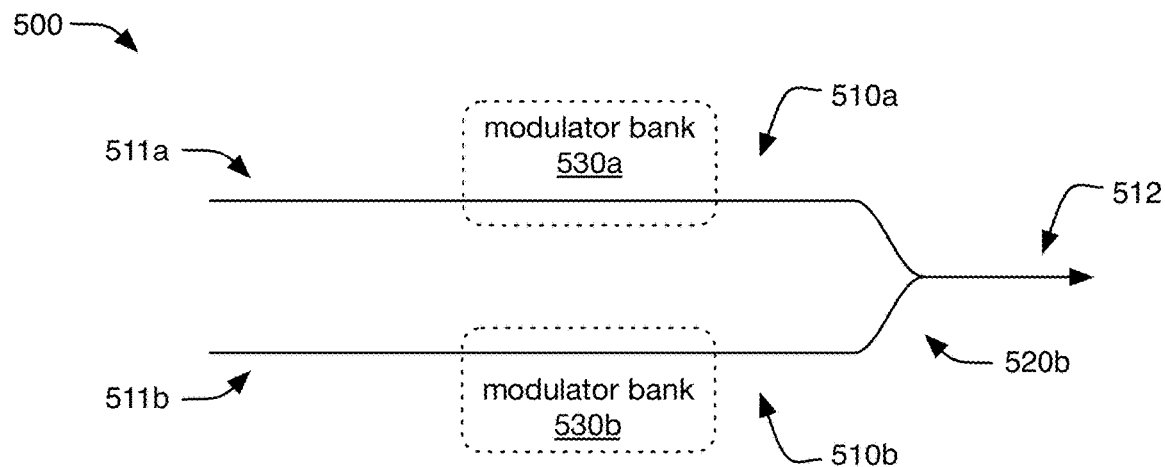
Figure 9B:
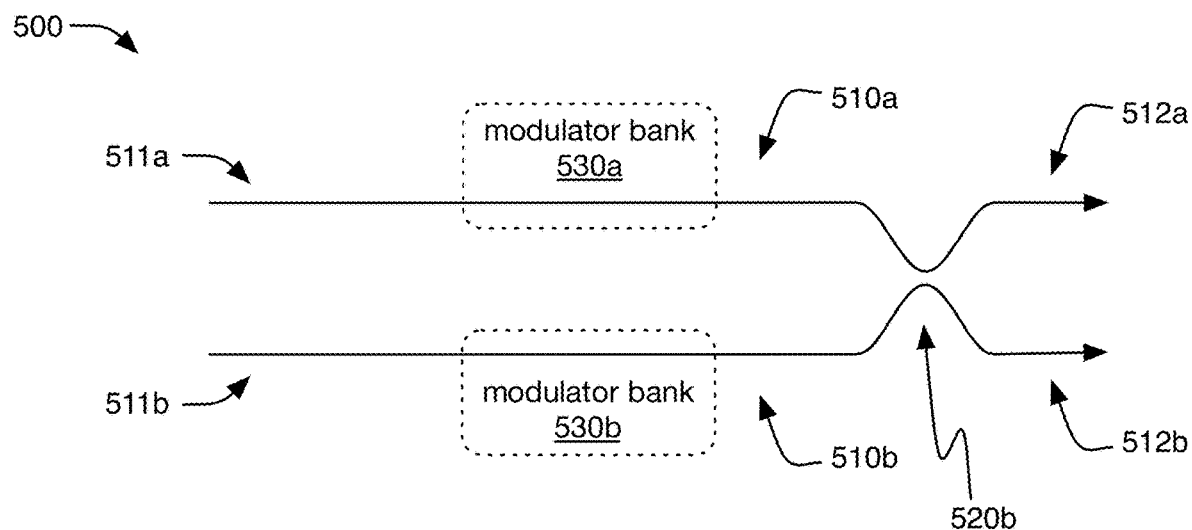
Figure 11A:
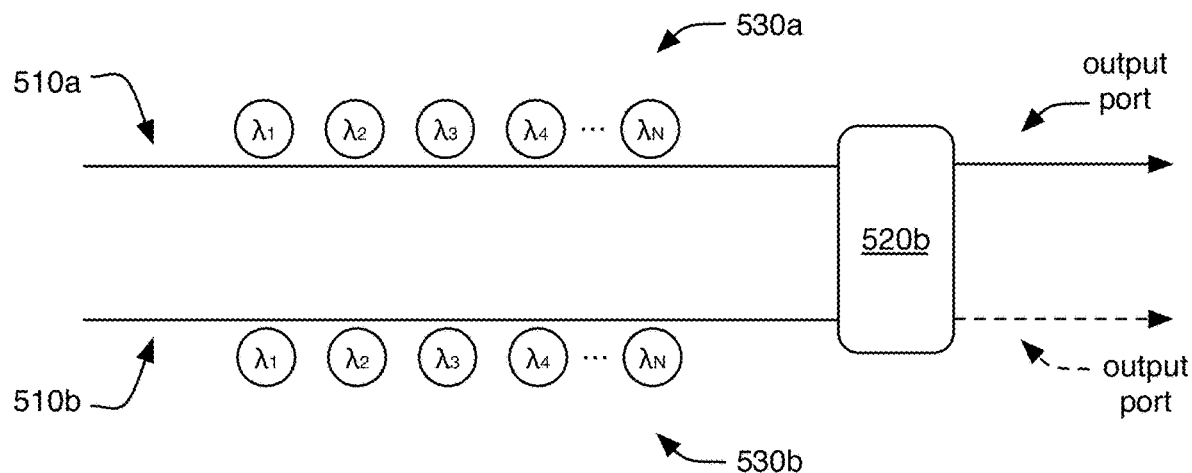
FIGS. 11A-11D are schematic representations of a first, second, third, and fourth example, respectively, of a portion of an input modulator unit of the system.
Figure 11B:
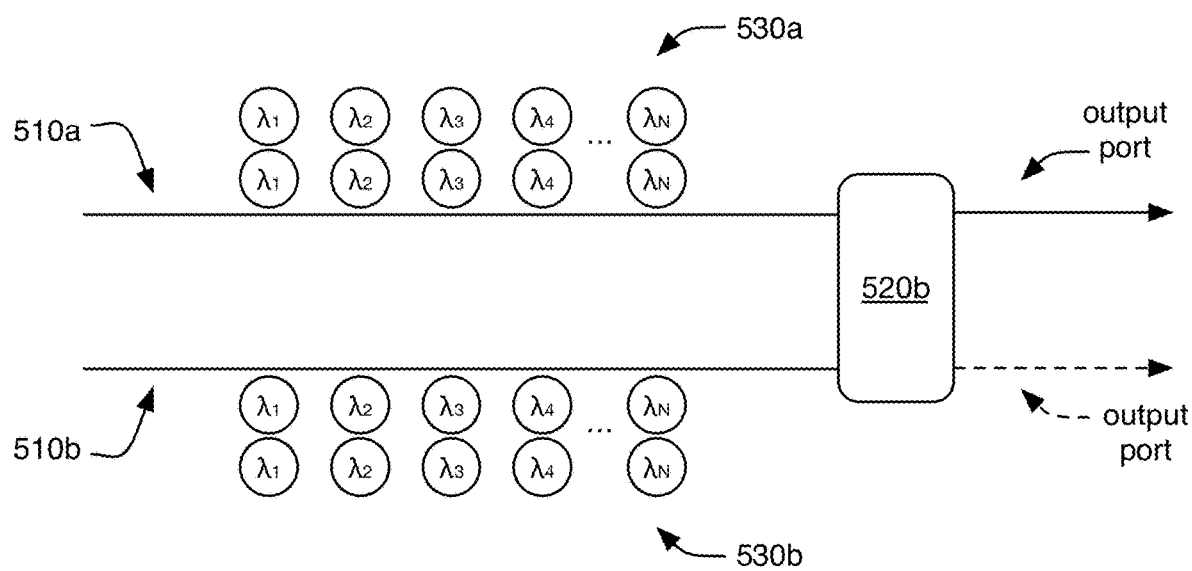
Figure 11C:
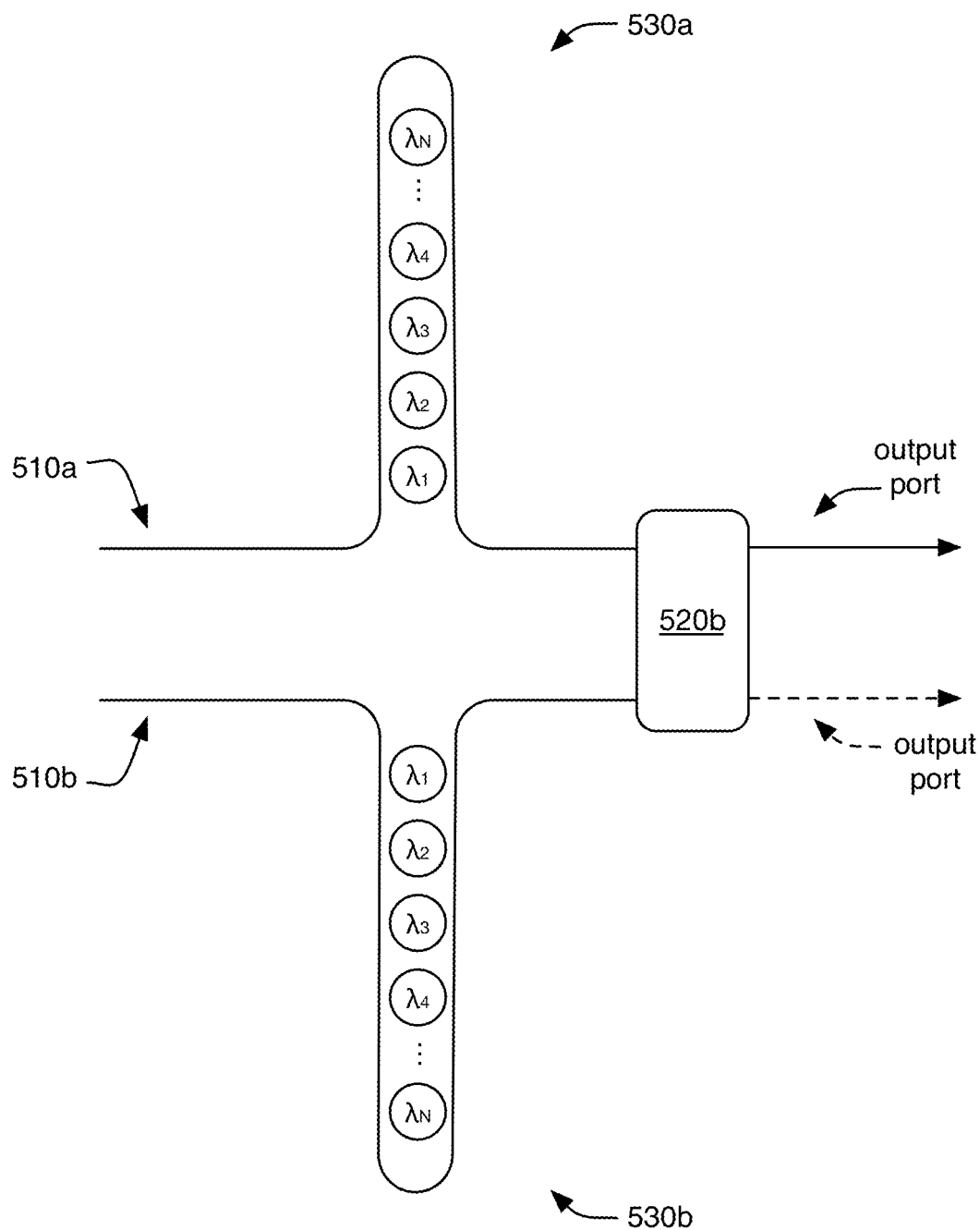
Figure 11D:
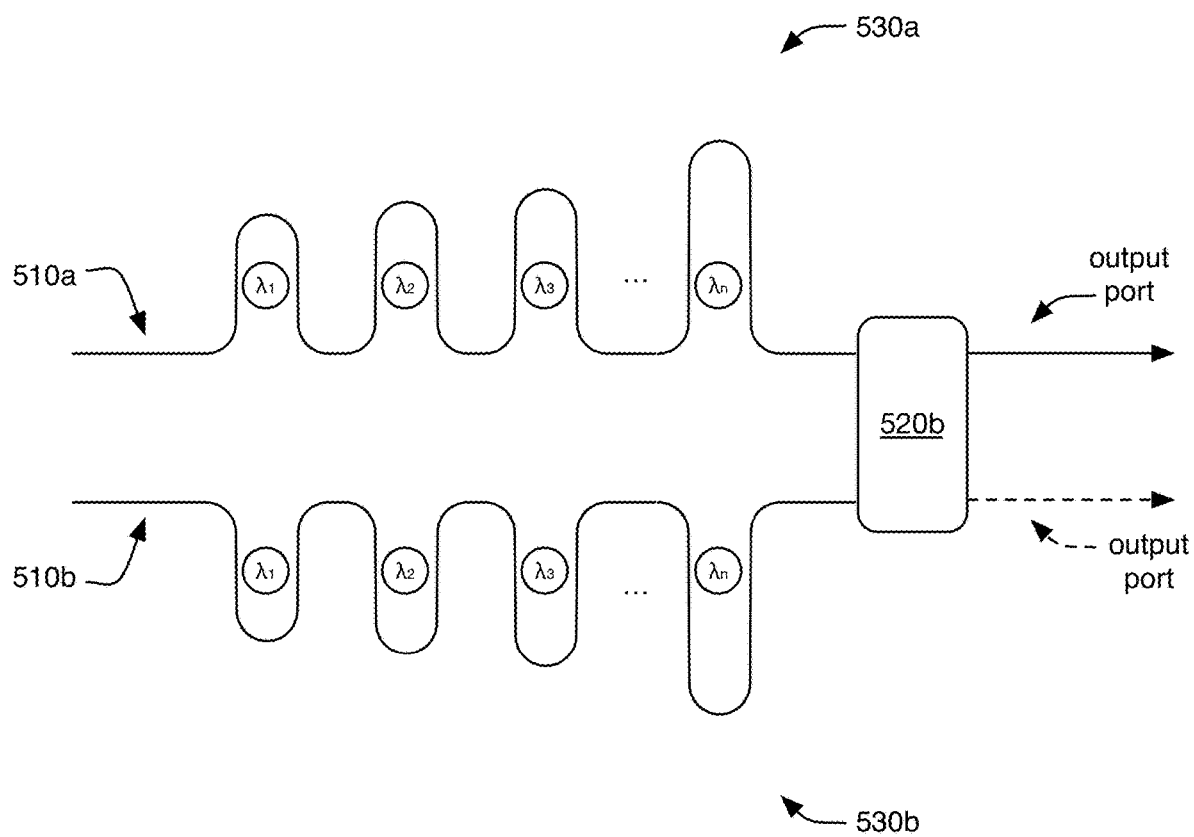

The waveguides 510 preferably function to define propagation paths for light traveling through the input modulator input modulator unit (e.g., traveling from one or more input ports to one or more output ports). The input modulator unit preferably includes two waveguides: a first arm 510a and a second arm 510b. One or both of the waveguides can define an input port 511 and/or output port 512. In a first example, the input modulator unit includes one input port 511 and one output port 512 (e.g., as shown in FIG. 7A). In other examples, the input modulator unit can include two input ports 511a,511b (e.g., as shown in FIGS. 9A-9B) and/or two output ports 512a,512b (e.g., as shown in FIGS. 7B, 8B, and 9B). For example, outputs from the two output ports can be used (e.g., by associated elements that receive the outputs from the input modulator unit 500) in homodyne detection systems. Each waveguide preferably defines a propagation path (e.g., from the input port and/or to the output port). However, the input modulator unit can additionally or alternatively include any other suitable number of waveguides in any suitable arrangement.

The input modulator unit is preferably configured to receive one or more optical inputs (e.g., multiwavelength optical input, such as from a comb source, other multiwavelength emitter, and/or set of emitters such as a set of single-wavelength emitters), preferably receiving the optical input(s) at one or both input ports 511.

A2. Couplers.

The couplers 520 preferably function to optically couple the two waveguides. The couplers are preferably directional couplers. The couplers are preferably wideband couplers, such as couplers with substantially wavelength-independent performance over a wide band (e.g., a band including all or substantially all wavelength channels to be modulated, such as all light received at the input port). For example, the input modulator unit can include one or more elements (e.g., wideband couplers) such as described in Kim et al., Tailorable and Broadband On-Chip Optical Power Splitter, *Appl. Sci.*, 2019, 9, 4239, which is herein incorporated in its entirety by this reference. However, the couplers can alternatively be narrowband couplers, wavelength-dependent couplers, and/or exhibit any other suitable wavelength response. The couplers preferably exhibit substantially equal coupling (e.g., wherein the couplers are 50:50 or 3 dB couplers), but can alternatively exhibit any other suitable coupling ratio (and/or other coupling behavior).

The input modulator unit preferably includes an output coupler 520b, and can optionally include an input coupler 520a. The input coupler 520a is preferably arranged proximal the input port(s). The input coupler is preferably a 1×2 coupler (e.g., splitter) that splits a single waveguide (e.g., that defines the input port 511) into the first arm 510a and second arm 510b (e.g., as shown in FIGS. 7A-7B). However, the input coupler can alternatively be a 2×2 coupler (e.g., optically coupling the first arm 510a and second arm 510b, such as shown by way of examples in FIGS. 8A-8B) and/or have any other suitable topology; alternatively, the input modulator unit can include no input coupler (e.g., as shown in FIGS. 9A-9B). In embodiments in which the input coupler is a 2×2 coupler, the input modulator unit preferably includes only a single input port (or, if the input modulator unit includes multiple input ports, preferably only receives an optical input from one input port at a time), but can alternatively include any suitable input ports.

The output coupler is preferably arranged proximal the output port(s) (e.g., further along the propagation paths defined by the waveguides than the input coupler). In some variants, the output coupler is a 2×1 coupler that merges the first and second arms into a single waveguide (e.g., that defines the output port 512), such as shown by way of examples in FIGS. 7A, 8A, and 9A. In other variants, the output coupler is a 2×2 coupler (e.g., optically coupling the first arm 510*a* and second arm 510*b*, such as shown by way of examples in FIGS. 7B, 8B, and 9B). However, the output coupler can alternatively have any other suitable topology. In alternate embodiments, the input modulator unit may not include an input coupler. In such embodiments, the input modulator unit preferably accepts substantially equivalent optical inputs at two input ports, but can additionally or alternatively accept any other suitable inputs (e.g., being substantially phase matched and/or having substantially equal amplitudes over all or substantially all wavelength channels).

However, the input modulator unit can additionally or alternatively include any other suitable couplers.

A3. Modulator Banks.

The modulator banks 530 preferably function to modulate light propagating through the input modulator unit (e.g., along the propagation paths defined by the waveguides). The modulator banks are preferably configured to independently (or substantially independently) modulate each wavelength channel (e.g., of the optical input). The modulator banks can preferably achieve arbitrary (or substantially arbitrary) modulation of the light (e.g., modulating the amplitude of each channel over a range, such as a range from substantially 100% transmission to substantially 0% transmission, and/or any suitable subset thereof).

Each modulator bank preferably includes a plurality of optical modulators 531. The optical modulators preferably function to control light transmission at various wavelengths. Each optical modulator preferably controls a different optical channel (e.g., as described below in more detail), more preferably wherein each optical channel is a wavelength channel. Alternatively, a single optical modulator can control multiple optical channels.

Each optical modulator preferably includes one or more microresonators (e.g., microring resonator, microdisk resonator, etc.), such as shown by way of examples in FIGS. 10A-10D. In some variations, the optical modulator includes multiple microresonators (e.g., as described in U.S. patent application Ser. No. 16/374,991, filed 4 Apr. 2019 and titled "Photonic Filter Bank System and Method of Use", which is hereby incorporated in its modulator by this reference; as shown in FIG. 10B; etc.). In some variations, the optical filter includes multiple modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). In some variations, the optical modulator includes one or more nested modulator elements, such as modulator elements including one or more microresonators (e.g., microrings, microdiscs, etc.) coupled to one or more outer feedback arms (e.g., coupled to the microresonator in an add/drop configuration, such as shown by way of examples in FIGS. 10C, 10D, 11C, and 11D). For example, the optical filter can include one or more nested modulator elements such as described in "S. Darmawan, Y. M. Landobada, and M. K. Chin, "Nested ring Mach-Zehnder interferometer", Opt. Express 15, 437-448 (2007), which is hereby incorporated in its entirety by this reference.

In some embodiments, the optical modulator can be operable to modulate the phase of light (e.g., of the associated optical channel) without substantially altering the light's amplitude. For example, the optical modulator can include a photonic crystal-based modulator with such properties, such as a photonic bandgap phase modulator (e.g., as described in U.S. Patent Application 62/873,006, filed 11 Jul. 2019 and titled "Photonic Bandgap Phase Modulator, Optical Filter Bank, and Method of Use", which is herein incorporated in its entirety by this reference).

However, the modulator banks can additionally or alternatively include any other suitable optical modulators.

The input modulator unit preferably includes one modulator bank 530 on each waveguide (and optionally includes multiple modulator banks 530 on one or more of the waveguides), preferably arranged between the input and output couplers (or, in embodiments with no input coupler, arranged between the input ports and the output coupler). The input modulator unit can include a first bank 530*a* arranged along (e.g., operable to modulate light propagating along) the first arm 510*a*, and a second bank 530*b* arranged along (e.g., operable to modulate light propagating along) the second arm 510*b* (e.g., as shown in FIGS. 11A-11D). The modulator banks are preferably substantially identical to each other (or have substantially identical modulators, possibly in different arrangements from each other).

Preferably, the input modulator unit is configured such that each channel (or a subset thereof) can be modulated by a pair of modulator elements (e.g., microresonators such as microrings and/or microdiscs, etc.), one in each modulator bank (arranged along different waveguides). The pair preferably operates cooperatively as a double-modulator (e.g., double-ring) enhanced MZI. The two modulator elements of the pair can have (and/or be tuned to) different resonances, such as resonance wavelengths on either side of the wavelength channel (target wavelength) they are configured to modulate (e.g., as described below regarding the method, as described in Liangjun Lu, Linjie Zhou, Xinwan Li, and Jianping Chen, "Low-power 2×2 silicon electro-optic switches based on double-ring assisted Mach-Zehnder interferometers", Opt. Lett. 39, 1633-1636 (2014), which is hereby incorporated in its entirety by this reference, etc.), preferably wherein the resonance wavelengths are closer (e.g., much closer, such as by a factor of at least 1.5, 2, 3, 5, 10, 20, 50, 1.5-3, 3-10, 10-30, and/or 30-100, etc.; slightly closer, such as by a factor between 1 and 1.5; etc.) to the target wavelength than to wavelengths of any other channel modulated by the filter bank.

In alternate embodiments, the input modulator unit can include a single modulator bank (e.g., wherein the modulator bank is operable to modulate phase without substantially altering amplitude, such as described above). In such embodiment, the modulator bank is preferably arranged along one of the waveguides, before the output coupler along the propagation path (e.g., between the input coupler and the output coupler; in embodiments without an input coupler, between the input port and the output coupler; etc.).

However, the input modulator unit can additionally or alternatively include any other suitable modulator banks and/or other elements in any suitable arrangement.

Appendix B: Additional Details.

B1. Source Module.

The system can include one or more source modules. The source module preferably functions to generate a plurality of multi-channel optical sources. The optical sources are preferably spatially-separated from each other, and are preferably substantially identical to one another (or substantially identical except for differences in overall intensity, such as wherein one source is attenuated compared to another, preferably attenuated substantially equally over all channels of the optical source). However, the multi-channel optical sources can additionally or alternatively include any other suitable optical sources.

Each optical source preferably includes light of a plurality of optically-distinct channels (e.g., wavelengths, modes, etc.), such as described below in more detail. The source module preferably includes one or more emitters (e.g., as described below in further detail). The emitters are preferably configured to collectively output multi-channel light, more preferably unmodulated light but alternatively light modulated in any suitable manner.

In a first embodiment, the source module includes one or more emitters (e.g., single-wavelength emitters 410a, multi-wavelength emitter(s) 410b, etc.) and/or transducers (e.g., polarizers, waveplates, mode filters and/or converters, etc.) that collectively produce light of n distinct optical channels (e.g., wavelengths), and includes a k-way splitter 430 that splits the n-channel output into the k different optical sources. In a first example of this embodiment (e.g., as shown in FIG. 2A), the source module includes a single multi-wavelength emitter (e.g., comb laser). In a second example of this embodiment (e.g., as shown in FIG. 2B), the source module includes n distinct single-wavelength emitters and a multiplexer 420 that combines the outputs of the emitters into a single waveguide. In a variation of this second example, the multiplexer and splitter are combined into a single n×k coupler that accepts n single-channel inputs and mixes them into k outputs (preferably substantially identical outputs, but alternatively outputs having any other suitable relationships, such as outputs of varying intensity). In a second embodiment (e.g., as shown in FIG. 2C), the source module includes a plurality of separate (e.g., independent or substantially independent, spatially separated, having non-intersecting or non-overlapping optical paths, etc.) emitter submodules 401 (e.g., k separate emitter submodules), each configured to emit a separate optical source (e.g., n-channel optical source).

Each emitter is preferably a laser (e.g., diode laser, preferably a component of an integrated circuit), such as a Fabry Perot cavity laser (e.g., with multiple modes, thereby outputting light of multiple wavelengths), a mode-locked laser (e.g., gain-absorber system) configured to output light of multiple wavelengths, a distributed feedback (DFB) laser, a distributed Bragg reflector (DBR) laser, and/or a vertical cavity surface emitting laser, but can additionally or alternatively include an LED and/or any other suitable light emitter. In some examples, an emitter (e.g., DFB laser emitting a single wavelength, DBR laser emitting multiple wavelengths, etc.) can be coupled to (output light to) one or more modulators (e.g., Mach-Zehnder modulators), wherein the modulators are driven by one or more varying (e.g., oscillating) signals, thereby generating additional optical channels.

The multiplexer preferably functions to combine multiple optical signals (e.g., channels) onto a single output path (e.g., a waveguide), such as for wavelength-division multiplexing (WDM). The multiplexer is preferably an optical multiplexer, such as an arrayed waveguide grating (AWG), but can additionally or alternatively be any other suitable multiplexer.

However, the source module can additionally or alternatively include any other suitable elements in any suitable arrangement.

In some embodiments, the plurality of channels can be differentiated based on wavelength, such as wherein the channels include different channels near (e.g., within a threshold distance of, substantially centered around, etc.) the 1.3 micron and/or 1.55 micron wavelength (e.g., within the 1.26-1.36 micron O-band, within the 1.53-1.565 micron C-band and/or the 1.565-1.625 micron L-band, etc.), wherein the wavelengths described herein preferably refer to the wavelength the light would have in free space, rather than to the wavelength of the light in the medium through which it is propagating. The wavelength channels are preferably narrow-band channels, such as channels of less than a threshold bandwidth (e.g., 1, 2, 5, 10, 15, 25, 40, 65, 100, 200, 500, 1000 GHz, 1-5, 5-20, 20-100, 100-300, and/or 300-1000 GHz frequency bandwidth; 0.01, 0.02, 0.05, 0.1, 0.2, 0.5, 1, 2, 5, 10, 0.01-0.05, 0.05-0.2, 0.2-1, 1-3, or 3-10 nm spectral bandwidth; etc.), but can additionally or alternatively include intermediate- and/or wide-band channels and/or channels of any other suitable widths.

The light of the channels of the optical source preferably has a bandwidth significantly narrower than the width of the associated channel, such as narrower by at least a threshold relative amount (e.g., less than 0.01, 0.03, 0.1, 0.2, 0.3. 0.4, 0.5, 0.001-0.01, 0.01-0.1, 0.1-0.3, 0.3-0.5, or more than 0.5 times the width of the associated channel, etc.) and/or absolute amount (e.g., 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz, etc.), more preferably wherein the light is farther than a threshold amount (e.g., 0.25-1 times the threshold amounts described above) from either edge of the associated channel. The light is preferably substantially centered within the associated channel (e.g., within a threshold amount of the center, such as 0.25-1 times the threshold amounts described above), but can alternatively be located at any other suitable location within the channel. In one example, the light has a linewidth less than a first threshold amount (e.g., 0.3, 1, 3, 10, 30, 100, 300, 1000, 3000, 0.3-3, 3-300, and/or 300-10,000 MHz, etc.). However, the light can additionally or alternatively occupy any other suitable amount of the spectrum.

The channels are preferably non-overlapping, more preferably having at least (and/or at most) a threshold spacing (e.g., threshold amount relative to the channel width, such as 5, 10, 25, 50, 100, 110, 125, 150, 175, 200, 250, 300, 400, 500, 0-1, 1-5, 5-15, 15-30, 30-60, 60-100, 100-110, 110-120, 120-150, 150-200, 200-300, or 300-500% of the channel width; absolute threshold amount, such as 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz; etc.) between each other (e.g., center-to-center distance, edge-to-edge distance, etc.). However, all or some of the channels can alternatively be overlapping (e.g., by no more and/or no less than a threshold amount, such as described above regarding the threshold spacing) and/or have any other suitable relationship to each other. The channels and/or emitters can be indexed based on wavelength (e.g., from shortest to longest wavelength, such as channel 1 being associated with the shortest wavelength, channel 2 being associated with the second shortest wavelength, etc.).

The channels can additionally or alternatively be associated with optical modes (e.g., transverse spatial modes, polarization modes, etc.). This can include, for example, using different spatial modes (e.g., higher-order TE modes, such as wherein the optical signals are originally in the $TE_o$ mode) and/or polarizations (e.g., TE and TM modes); in such examples, the waveguide into which the multi-channel signal is coupled is preferably a multi-mode waveguide (e.g., waveguide configured to support all of the outputs to be coupled into it).

However, the channels can additionally or alternatively include any other suitable optical channels, such as channels associated with any other suitable optical characteristics.

B2. Optical Modulators.

The system can include one or more optical modulators. Each optical modulator can be electro-absorptive and/or electro-refractive. The optical modulator can optionally be embedded in one or more other structures, such as a resonator and/or Mach-Zehnder interferometer (MZI) (e.g., which can function to enhance its modulation performance). In examples, the optical modulator can include one or more microresonators (e.g., microring resonator, microdisk resonator, etc.), quantum confined Stark effect (QCSE) modulator, Zeno effect modulator (e.g., graphene based modulator, such as a silicon photonic graphene modulator), MZI modulator, electro-absorptive modulator embedded in a critically coupled resonator (e.g., QCSE microdisk modulator), photonic crystal-based modulator (e.g., photonic crystal defect state modulator; photonic bandgap phase modulator, such as described in International Patent Application Number PCT/US20/40906, filed 6 Jul. 2020 and titled "Photonic Bandgap Phase Modulator, Optical Filter Bank, Photonic Computing System, and Methods of Use", which is herein incorporated in its entirety by this reference; etc.), and/or any other suitable optical modulator. The optical modulator (e.g., wideband modulator) can optionally be embedded in and/or in series (along the optical path) with one or more filters (e.g., spectral filters), such as an electro-absorptive modulator preceded (along the optical path) by a first filter and followed by a second filter. In some variations, the optical modulator includes multiple microresonators (e.g., as described in U.S. patent application Ser. No. 16/374,991, filed 4 Apr. 2019 and titled "Photonic Filter Bank System and Method of Use", which is hereby incorporated in its entirety by this reference). The optical modulators can additionally or alternatively include mode modulators (e.g., as described in Lian-Wee Luo, Noam Ophir, Christine P. Chen, Lucas H. Gabrielli, Carl B. Poitras, Keren Bergmen, and Michal Lipson, "WDM-compatible mode-division multiplexing on a silicon chip," $Nat.$ $commun.$ 5, 3069 (2014), which is hereby incorporated in its entirety by this reference). In some variations, the optical modulator includes multiple filters and/or modulators coupled together using inverse design (e.g., as described in Molesky, S., Lin, Z., Piggott, A. Y. et al., "Inverse design in nanophotonics," $Nat.$ $photon.$ 12, 659-670 (2018), which is hereby incorporated in its entirety by this reference). However, the system can additionally or alternatively include any other suitable optical modulators, or include no such modulators.

B3. Couplers.

The system can include one or more couplers (e.g., directional couplers, such as splitters, etc.). A coupler can include one or more coupler elements, such as two-way splitters, star couplers, multi-mode interference (MMI) couplers, inverse designed couplers, and/or any other suitable elements.

Some or all of the couplers (e.g., couplers through which multiple wavelength channels, such as all channels in use in the system, pass) are preferably wideband couplers, such as couplers with substantially wavelength-independent performance over a wide band (e.g., a band including all or substantially all wavelength channels to be modulated, such as all light received at the input port). For example, the system can include one or more elements (e.g., wideband couplers) such as described in Kim et al., Tailorable and Broadband On-Chip Optical Power Splitter, $Appl.$ $Sci.,$ 2019, 9, 4239, which is herein incorporated in its entirety by this reference. However, the couplers can alternatively be narrowband couplers, wavelength-dependent couplers, and/or exhibit any other suitable wavelength response. The couplers preferably exhibit substantially equal coupling (e.g., wherein the couplers are 50:50 or 3 dB couplers), but can alternatively exhibit any other suitable coupling ratio (and/or other coupling behavior).

In one example, a coupler includes a tree splitter, including a plurality of splitter elements in a tree configuration (e.g., including a plurality of two-way splitters arranged in a binary tree). In some variations, the tree splitter can include elements of one or more of the above types, such as including a plurality of 1×m couplers (i.e., couplers that split a single input into m paths) combined in serial layers to provide nk outputs. For example, the splitter can be a two-stage splitter. In a specific example (e.g., in which nk is a square number), each stage splits the signal into $\sqrt{nk}$ copies. In this specific example, the first stage includes a single $\sqrt{nk}$-way splitter, and the second stage includes $\sqrt{nk}$ separate $\sqrt{nk}$-way splitters, each of which receives an output from the first stage splitter. However, the tree splitter can additionally or alternatively include any other suitable stages and/or number of stages.

B4. Filter Banks.

The system can include one or more filter banks (e.g., input modulator units and/or modulator banks thereof, etc.). The filter bank preferably includes a plurality of filter elements (e.g., optical filters), more preferably channel-specific filters (e.g., n separate channel-specific filters), such as wherein each filter element is associated with (e.g., filters) a channel (or set of channels) of the input signal. For wavelength-based channels, the filter elements can be wavelength-specific filters (e.g., wherein the filter bank is a spectral filter bank). Each filter preferably receives a different multiplier value (e.g., weight value, activation value, etc.) and modulates the associated channel based on that multiplier value. A person of skill in the art will recognize that each filter element can include a single filtering device, multiple filtering devices (e.g., arranged in series and/or parallel), multiple tunable elements, and/or any other suitable elements capable of filtering a channel (or set of channels) of the input signal. Although referred to herein as filter banks, a person of skill in the art will recognize that such terminology does not necessarily imply a particular rate at which operation of the filter banks can be changes; rather, in some variants, the multiplier values can be changed at any suitable rate.

The filter elements (e.g., of the filter banks) preferably function to filter the optical input signal. In a first embodiment of the filter bank, every channel propagates past all the filter elements of the filter bank. In this embodiment, the filter elements are preferably wavelength-selective optical filters (e.g., substantially filtering only a narrow wavelength band, such as substantially filtering only light of a single channel). The wavelength-selective optical filters are preferably microresonators (e.g., more preferably microdisk resonators, but additionally or alternatively including microring resonators, photonic crystal defect state filters, etc.). The microresonators (e.g., microdisks, microrings, etc.) can have any suitable doping geometry, such as, for example, vertical junction, interleaved, interior ridge, and/or zig-zag doping geometries.

The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference), preferably an even number of microresonators, such as two microresonators, but alternatively any other suitable number of microresonators. In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). Each filter of a filter bank preferably has a different resonance wavelength (e.g., resonance wavelength under a particular set of conditions, such as a typical operating temperature and no applied voltage). Preferably, each resonance wavelength corresponds to (e.g., is within, such as substantially centered within) a different wavelength channel. In some examples, each optical filter is associated with a filter monitor (e.g., configured to detect light filtered by, coupled into and/or through, and/or otherwise affected by the filter), such as a resonator with an intracavity detector, or an add-drop resonator that couples a portion of the filtered light to a photodetector.

In a second embodiment, each channel is split onto a different sub-path to interact with a filter element associated with that channel. In a first example of this embodiment, the modulated path includes for each channel: a drop filter to branch a sub-path off the main path, a filter on that sub-path, and an add filter to rejoin the signal from the sub-path to the main path. In this example, the filter is preferably a microresonator (e.g., microring resonator, microdisk resonator, etc.), but can additionally or alternatively include a Bragg filter (e.g., fiber Bragg grating; Bragg reflector, preferably with a mirror and circulator such as a monolithic Bragg reflector with an optical loop mirror and a circulator; wavelength-selective coupler with embedded grating; etc.) and/or any other suitable filter. In a second example, the modulated path includes a demultiplexer to create a plurality of sub-paths, a filter on each sub-path, and a multiplexer to recombine the sub-paths following modulation. In this embodiment, each filter can be an electro-refractive element, a microresonator, and/or any other suitable filter.

In some embodiments, the filter banks can include amplitude-based filter banks (e.g., as described in U.S. Pat. No. 8,027,587, issued 27 Sep. 2011 and titled "Integrated Optic Vector-Matrix Multiplier", in U.S. Pat. No. 10,009,611, issued 26 Jun. 2018 and titled "System and Method for Photonic Processing", and/or in U.S. Pat. No. 10,656,336, issued 16 May 2020 and titled "Method for Phase-Based Photonic Computing", each of which is hereby incorporated in its entirety by this reference; for example, as described in U.S. Pat. No. 10,656,336 regarding "amplitude weight banks"). In some embodiments, the filter banks can include phase-based filter banks (e.g., as described in U.S. Pat. No. 10,656,336, issued 16 May 2020 and titled "Method for Phase-based Photonic Computing", which is hereby incorporated in its entirety by this reference; for example, as described in U.S. Pat. No. 10,656,336 regarding "phase weight banks").

However, the system can additionally or alternatively include any other suitable optical filters. Although referred to herein as optical filters, a person of skill in the art will recognize that the filters can additionally or alternatively include optical switches, optical modulators, and/or any other suitable elements.

B5. Material Platforms.

The system (and/or elements thereof, such as some or all of the photonic elements) can be implemented on one or more material platforms, such as photonic integrated circuit platforms (e.g., silicon photonics platforms, monolithically integrated photonics and electronics platforms, other photonic platforms, etc.), microelectronic platforms, and/or any other suitable material platforms. In a first embodiment, the system is implemented as a monolithic platform (e.g., including both photonic elements and electronic elements on a single chip). In a second embodiment, the system is implemented as a heterogeneously integrated platform, such as a platform including two or more chips (e.g., with electronic and/or photonic interfaces between the chips). For example, the heterogeneously integrated platform can include a photonics chip including photonic elements (e.g., and relatively few or no electronic elements, relatively few or no electronic elements with fabrication dimensions below a threshold, etc.; alternatively, including significant electronic elements) and an electronics chip including electronic elements (e.g., and few or no photonic elements; alternatively, including significant photonic elements). In some examples (e.g., of the second embodiment), the system is fabricated via co-integration (e.g., between electronics and photonics), such as wherein different elements of the system can be joined together (e.g., for wafer-to-wafer, die-to-wafer, and/or die-to-die bonding) using one or more packaging technologies such as flip chip bonding, wafer bonding (e.g., direct bond interconnect, hybrid bonding, etc.), through-oxide vias (TOVs), through-silicon vias (TSVs), metal bonding (e.g., eutectic bonding), adhesive bonding, and/or any other suitable bonding interfaces.

In one embodiment, the system can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAMs, etc.). Additionally or alternatively, the system can include elements implemented in one or more III-V platforms (e.g., JePPiX consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InGaAsP alloys, such as InP or GaAs substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which elements from a 7 nm electronics platform (e.g., with a 0.6-0.8V limit, such as a 0.65, 0.7, or 0.75 V limit) are coupled with elements from a silicon photonics platform, the silicon photonics platform elements can include transistors (e.g., configured to amplify signals received from the electronics platform elements) operating with voltages in excess of the electronics platform limit.

The system can additionally or alternatively include elements implemented in a monolithically integrated photonics and electronics platform (e.g., platform typically used for microelectronics) such as a monolithically integrated silicon photonics and electronics platform, preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPiX consortium TriPLeX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

In a specific example, the system includes elements fabricated such as described in U.S. Pat. No. 8,027,587, issued 27 Sep. 2011 and titled "Integrated Optic Vector-Matrix Multiplier", which is hereby incorporated in its entirety by this reference (e.g., elements fabricated as described regarding fabrication on silicon-on-insulator wafers).

A person of skill in the art will recognize that the elements described herein using the term "waveguide" can additionally or alternatively include any other suitable optical paths and/or elements associated with optical paths (including, without limitation, free-space paths and/or paths including free-space segments).

However, the system can additionally or alternatively be implemented in any other suitable material platform, and can additionally or alternatively include any other suitable materials.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for parallel photonic computation, comprising:
   at an optical interference unit (OIU), receiving a plurality of optical inputs, wherein:
      each optical input of the plurality is received at the OIU substantially concurrently;
      each optical input of the plurality comprises a respective plurality of single-channel input signals multiplexed over a plurality of optical channels, wherein each single-channel input signal of the respective plurality of single-channel input signals is associated with a different optical channel of the plurality of optical channels;
      the plurality of optical inputs is representative of a set of input vectors; and
      for each optical channel of the plurality:
         the plurality of optical inputs cooperatively define a respective input vector of the set, wherein each optical input is associated with a different element of the input vector; and
         for each optical input of the plurality, the single-channel input signal associated with the optical channel defines a respective optical power substantially proportional to the square of the associated element of the input vector;

at a unitary matrix multiplier (UMM) of the OIU, receiving a control signal indicative of a unitary matrix;
at the OIU, in response to receiving the plurality of optical inputs and the control signal, generating a plurality of optical outputs, comprising, at the UMM, concurrently for each input vector of the set, optically computing a unitary matrix product of the input vector and the unitary matrix, wherein:
  each optical output of the plurality comprises a respective plurality of single-channel output signals multiplexed over the plurality of optical channels, wherein each single-channel output signal of the respective plurality of single-channel output signals is associated with a different optical channel of the plurality of optical channels;
  the plurality of optical outputs is representative of a set of output vectors; and
  for each optical channel of the plurality:
    the plurality of optical outputs cooperatively define a respective output vector of the set, wherein each optical output is associated with a different element of the output vector; and
    for each optical output of the plurality, the single-channel output signal associated with the optical channel defines a respective optical power substantially proportional to the square of the associated element of the output vector; and
    for each optical output of the plurality, demultiplexing the optical output into the respective plurality of single-channel output signals.

2. The method of claim 1, further comprising, for each optical input of the plurality:
at a respective input modulator unit, independently modulating each channel of a respective multi-channel optical source to generate the optical input; and
providing the optical input to the OIU.

3. The method of claim 2, wherein each input modulator unit exhibits phase-stable behavior.

4. The method of claim 1, further comprising, at a set of detectors, for each single-channel output signal of the plurality of optical outputs, transducing the single-channel output signal into a respective electrical signal.

5. The method of claim 4, further comprising:
at an electronic computing module:
  receiving one or more of the electrical signals transduced by the set of detectors from the single-channel output signals; and
  modifying the one or more electrical signals into one or more modified electrical signals;
  providing one or more input signals, representative of the one or more modified electrical signals, to a second OIU; and
  at the second OIU, in response to receiving the one or more input signals, performing an optical computation based on the one or more input signals.

6. The method of claim 5, wherein:
the one or more electrical signals comprises each electrical signal transduced by the set of detectors from the single-channel output signals, wherein the one or more electrical signals are cooperatively representative of the set of output vectors;
modifying the one or more electrical signals comprises computing a set of diagonal matrix products, comprising:
  receiving a control signal indicative of a diagonal matrix; and
  for each output vector of the set, computing a product of the output vector and the diagonal matrix, wherein a respective set of the modified electrical signals are representative of the product; and
providing the one or more input signals to the second OIU comprises:
  based on the one or more modified electrical signals, generating a second plurality of optical inputs cooperatively representative of the set of diagonal matrix products; and
  providing the second plurality of optical inputs to the second OIU substantially concurrently.

7. The method of claim 6, further comprising, at the second OIU, receiving a second control signal indicative of a second unitary matrix, wherein performing the optical computation comprises, for each diagonal matrix product of the set, optically computing a product of the diagonal matrix product with the second unitary matrix.

8. The method of claim 7, wherein the second OIU is the OIU, wherein performing the optical computation is performed at the UMM.

9. The method of claim 5, wherein modifying the one or more electrical signals into one or more modified electrical signals comprises performing a non-linear transformation on the one or more electrical signals.

10. The method of claim 1, further comprising, at a diagonal matrix multiplier (DMM) of the OIU, receiving a second control signal indicative of a diagonal matrix, wherein generating the plurality of optical outputs further comprises, at the DMM, concurrently for each unitary matrix product, optically computing a respective diagonal matrix product of the unitary matrix product and the diagonal matrix.

11. The method of claim 10, further comprising, at a second UMM of the OIU, receiving a third control signal indicative of a second unitary matrix, wherein generating the plurality of optical outputs further comprises, at the second UMM, concurrently for each diagonal matrix product, optically computing a respective second unitary matrix product of the diagonal matrix product and the second unitary matrix.

12. The method of claim 1, wherein the optical channels of the plurality are delimited based on wavelength, wherein each optical input and each optical output is wavelength-division multiplexed.

13. A system for parallel photonic computation, the system associated with k optical channels, wherein k is a first integer greater than one, the system comprising:
n input modulator units, wherein n is a second integer greater than one, each input modulator unit configured to:
  receive a respective multi-channel optical source comprising light of the k optical channels; and
  independently modulate each channel of the respective multi-channel optical source to generate a respective optical input multiplexed over the k optical channels;
an optical interference unit (OIU) comprising a unitary matrix multiplier (UMM), the OIU comprising n optical input ports and n optical output ports, each optical input port optically coupled to a different input modulator unit of the system, the OIU configured to:
  receive n optical inputs, comprising, at each optical input port, receiving a respective optical input from a respective input modulator unit, wherein the n optical inputs cooperatively define k input vectors, each input vector represented by a different optical channel;

receive a control signal indicative of a n×n unitary matrix;

at the UMM, concurrently for each of the k optical channels, optically compute a respective unitary matrix product of the respective input vector with the n×n unitary matrix; and output n optical outputs, each optical output multiplexed over the k optical channels, comprising, at each optical output port, outputting a respective optical output; and n detector banks, each optically coupled to a different optical output port of the OIU and configured to receive the respective optical output from the optical output port, each detector bank comprising a demultiplexer and k detectors, wherein:

the demultiplexer is configured to spatially separate the k optical channels of an optical output and provide each optical channel to a different detector of the detector bank; and each detector of the detector bank is configured to accept a respective optical channel and transduce it into a respective electrical signal.

14. The system of claim 13, wherein the UMM comprises a network of SU(2) transform elements, wherein each SU(2) transform element of the network:

receives a control signal indicative of a respective SU(2) transform;

receives a respective first multiplexed optical input and a respective second multiplexed optical input;

concurrently performs the SU(2) transform on each optical channel of the respective first and second multiplexed optical inputs to generate a respective first multiplexed optical output and a respective second multiplexed optical input; and outputs the respective first and second multiplexed optical outputs.

15. The system of claim 14, wherein the network defines a square decomposition of the n×n unitary matrix.

16. The system of claim 14, wherein each SU(2) transform element of the network comprises a respective Mach-Zehnder modulator.

17. The system of claim 13, wherein each input modulator unit of the system comprises:

a first optical path defining a first input end;

a second optical path defining a second input end;

a directional coupler that optically couples the first and second optical paths;

a first modulator bank optically coupled to the first optical path between the first input end and the directional coupler, the first modulator bank comprising k optical modulators, each optical modulator of the first modulator bank associated with a different optical channel of the k optical channels; and a second modulator bank optically coupled to the second optical path between the second input end and the directional coupler, the second modulator bank comprising k optical modulators, each optical modulator of the second modulator bank associated with a different optical channel of the k optical channels.

18. The system of claim 13, wherein the OIU further comprises a diagonal matrix multiplier (DMM) configured to:

receive a second control signal indicative of a n×n diagonal matrix; and concurrently for each of the k optical channels, optically compute a respective diagonal matrix product of the respective unitary matrix product with the n×n diagonal matrix.

19. The system of claim 18, wherein the OIU further comprises a second UMM configured to:

receive a third control signal indicative of a second n×n unitary matrix; and concurrently for each of the k optical channels, optically compute a respective second unitary matrix product of the respective diagonal matrix product with the second n×n unitary matrix.

20. The system of claim 13, wherein each detector bank of the n detector banks further comprises a respective homodyne detection arm configured to optically couple an optical reference to the respective optical output.

21. The system of claim 20, wherein, for each detector bank of the n detector banks, the respective homodyne detection arm is configured to optically couple the optical reference to the respective optical output after demultiplexing the optical output.

22. The system of claim 20, further comprising a phase shifter configured to modulate a phase of the optical reference.

* * * * *